(12) United States Patent
Mathias et al.

(10) Patent No.: US 9,094,928 B2
(45) Date of Patent: Jul. 28, 2015

(54) MULTIPLE NETWORK MOBILE DEVICE CONNECTION MANAGEMENT

(75) Inventors: Arun G. Mathias, Sunnyvale, CA (US); Madhusudan Chaudhary, Cupertino, CA (US); Jianxiong Shi, Plesanton, CA (US)

(73) Assignee: Apple Inc., Cupertino, CA (US)

( * ) Notice: Subject to any disclaimer, the term of this patent is extended or adjusted under 35 U.S.C. 154(b) by 478 days.

(21) Appl. No.: 13/438,666

(22) Filed: Apr. 3, 2012

(65) Prior Publication Data

US 2012/0258707 A1 Oct. 11, 2012

Related U.S. Application Data

(60) Provisional application No. 61/472,617, filed on Apr. 6, 2011.

(51) Int. Cl.
| | | |
|---|---|---|
| *H04B 1/04* | (2006.01) | |
| *H04W 4/00* | (2009.01) | |
| *H04W 36/00* | (2009.01) | |
| *H04W 40/00* | (2009.01) | |
| *H04W 68/00* | (2009.01) | |
| *H04W 36/30* | (2009.01) | |
| *H04W 36/18* | (2009.01) | |
| *H04W 68/02* | (2009.01) | |

(52) U.S. Cl.
CPC .............. *H04W 68/00* (2013.01); *H04W 36/30* (2013.01); *H04W 36/18* (2013.01); *H04W 68/02* (2013.01)

(58) Field of Classification Search
CPC ..... H04W 68/00; H04W 68/02; H04W 36/30; H04W 36/18

USPC ............. 455/127.4, 422.1, 432.1, 435.1, 436, 455/440, 443, 448, 553, 458
See application file for complete search history.

(56) References Cited

U.S. PATENT DOCUMENTS

| | | | |
|---|---|---|---|
| 6,895,255 | B1 | 5/2005 | Bridgelall |
| 7,139,589 | B2 | 11/2006 | Sawada |
| 7,688,784 | B2 | 3/2010 | Bitran et al. |
| 7,720,045 | B2 | 5/2010 | Bahl et al. |
| 8,731,605 | B1* | 5/2014 | Shetty et al. ............... 455/552.1 |
| 2008/0153483 | A1* | 6/2008 | Abu-Amara ............... 455/432.1 |
| 2011/0122809 | A1* | 5/2011 | Yun et al. ...................... 370/328 |
| 2011/0149907 | A1* | 6/2011 | Olsson et al. ................. 370/331 |
| 2011/0296034 | A1* | 12/2011 | Mayer et al. .................. 709/227 |
| 2012/0040670 | A1* | 2/2012 | Chin et al. ................. 455/435.1 |
| 2012/0257600 | A1* | 10/2012 | Diachina et al. ............. 370/332 |

OTHER PUBLICATIONS

Rohde & Schwarz, "Voice and SMS in LTE," White Paper 1MA197, May 2011, 45 pages.

(Continued)

*Primary Examiner* — Dung Hong
(74) *Attorney, Agent, or Firm* — Downey Brand LLP

(57) ABSTRACT

A mobile wireless device maintains registration on two parallel wireless communication networks that each use different wireless communication protocols. In response to a first connection request received from a first wireless network, the mobile wireless device tunes a single receiver contained therein from the first wireless network to a second wireless network. Subsequently in response to a second connection request received from the second wireless network, the mobile wireless device connects to the second wireless network.

23 Claims, 15 Drawing Sheets

(56) References Cited

OTHER PUBLICATIONS

Rohde & Schwarz, "UMTS Long Term Evolution (LTE) Technology Introduction," Application Note 1MA111, Dec. 9, 2008, 55 pages.

Motorola, Inc., "Long Term Evolution (LTE): A Technical Overview," Technical White Paper, (2007), 15 pages.

* cited by examiner

MULTIPLE NETWORK MOBILE DEVICE CONNECTION MANAGEMENT

CROSS REFERENCE TO RELATED APPLICATIONS

This U.S. Patent Application claims priority under 35 U.S.C. 119(e) to U.S. Provisional Patent Application No. 61/472,617, filed Apr. 6, 2011 and entitled "MULTIPLE NETWORK MOBILE DEVICE CONNECTION MANAGEMENT" by Mathias et al, which is incorporated by reference herein in its entirety for all purposes.

TECHNICAL FIELD

The described embodiments generally relate to methods and apparatuses for managing connections for mobile wireless devices. More particularly, the present embodiments describe connection management for mobile wireless devices that support multiple wireless networks where each wireless network can use a different wireless communication technology.

BACKGROUND

Wireless networks continue to evolve as new communication technologies develop and standardize. Current wireless network deployments include many variations in architecture, including support for multiple wireless communication technologies simultaneously by one or more wireless network service providers. A representative wireless network for a wireless network service provider can include support for one or more releases of wireless communication protocols specified by the Third Generation Partnership Project (3GPP) and Third Generation Partnership Project 2 (3GPP2) communication standards organizations. The 3GPP develops mobile communication standards that include releases for Global System for Mobile Communications (GSM), General Packet Radio Service (GPRS), Universal Mobile Telecommunications System (UMTS), Long Term Evolution (LTE) and LTE Advanced standards. The 3GPP2 develops wireless communication standards that include CDMA2000 1xRTT and 1xEV-DO standards. A representative wireless network for a wireless network service provider can include simultaneous support for one or more releases of the Third Generation Partnership Project (3GPP) Long Term Evolution (LTE) wireless communication standard and one or more releases of the Third Generation Partnership Project 2 (3GPP2) CDMA2000 1x (also referred to as 1xRTT or 1x) wireless communication standard. This representative simultaneous wireless network can support circuit switched voice connections through a CDMA2000 1x wireless network and packet switched connections (voice or data) through an LTE wireless network.

Dual receiver mobile wireless devices can include separate sets of circuitry known as receive signal chains for receiving signals from different wireless communication networks that can operate according to different wireless communication protocols that can use different wireless communication technology, particularly in the radio frequency access network portions of the wireless communication network. With separate receive signal chains, a dual receiver mobile wireless device can connect simultaneously to two different wireless communication networks that can use two different wireless communication technologies. The dual receiver mobile wireless device can independently receive pages from one wireless communication network, e.g. a CDMA2000 1x wireless network, through one receive signal chain and also receive pages from a second wireless communication network, e.g. an LTE wireless network through a second receive signal chain. Even when the dual receiver mobile wireless device is connected to and actively transferring data through the LTE wireless network using one of the receivers, the dual receiver mobile wireless device can receive a page requesting a separate voice connection from the CDMA2000 1x wireless network through a second receiver. Thus the dual receiver mobile wireless device can establish a mobile originated or a mobile terminated circuit switched voice connection over the CDMA2000 1x wireless network while also remaining connected to (or camped on) the packet switched LTE wireless network.

A single receiver mobile wireless device, however, can only camp on one wireless communication network at a time, e.g. either on the evolved Universal Mobile Telecommunications System (UMTS) Terrestrial Radio Access Network (eUTRAN) of the LTE wireless network or on the radio access network (RAN) of the CDMA2000 1x wireless network, but not to both wireless communication networks simultaneously. When the LTE wireless network does not support a circuit switched fall back (CSFB) mode or provide for voice over LTE (VoLTE) connections, the single receiver mobile wireless device can be unable to receive a page from the CDMA2000 1x wireless network and to establish a mobile terminated voice connection with the CDMA2000 1x wireless network when camped simultaneously on the eUTRAN of the LTE wireless network. Thus, there exists a need for a method whereby a single receiver mobile wireless device can achieve similar functionality to a dual receiver mobile wireless device, so that the single receiver mobile wireless device can retain the ability to complete a circuit switched voice connection through a first wireless network, such as the CDMA2000 1x wireless network, when camped on a second wireless network, such as on the eUTRAN of a parallel LTE wireless network.

SUMMARY OF THE DESCRIBED EMBODIMENTS

In one embodiment, a method of managing connections between a mobile wireless device and a plurality of wireless networks is described. The method includes at least the following steps. In a first step, the mobile wireless device registers with a first wireless network and also registers with a second wireless network. Subsequently, the mobile wireless device receives a connection origination message from the first wireless network and in response connects to the second wireless network. The first and second wireless networks each use a different wireless communication protocol. In some embodiments, the mobile wireless device sends a connection rejection message to the first wireless network before connecting to the second wireless network. In an embodiment, the first wireless network uses a 3GPP LTE wireless communication protocol and the second wireless network uses a 3GPP2 CDMA2000 1x wireless communication protocol.

In another embodiment, a mobile wireless device including a receiver and a configurable processor is described. The receiver is tunable to receive signals from a first wireless network and also to receive signals from a second wireless network. The processor is configured to register the mobile wireless device with the first and second wireless networks. The processor is also configured to receive a connection origination message from the first wireless network and in response establish a connection between the mobile wireless device and the second wireless network. The first and second wireless networks each use different wireless communication protocols.

In a further embodiment, non-transitory computer program product encoded in a non-transitory computer readable medium for managing connections between a mobile wireless device and a plurality of wireless networks is described. The non-transitory computer program product in the mobile wireless device includes the following non-transitory computer program code. Non-transitory computer program code for registering the mobile wireless device with a first wireless network and with a second wireless network. Non-transitory computer program code for receiving a connection origination message from the first wireless network and in response connecting the mobile wireless device to the second wireless network. The first and second wireless networks each use a different wireless communication protocol. In some embodiments, the non-transitory computer program product also includes the following non-transitory computer program code. Non-transitory computer program code for releasing one or more radio access bearers between the mobile wireless device and the first wireless network and for sending a connection rejection message to the first wireless network in response to receiving the connection origination message from the first wireless network. In addition, non-transitory computer program code for tuning the receiver of the mobile wireless device from the first wireless network to the second wireless network and for receiving a connection request from the second wireless network. In an embodiment, the connection origination message is a SIP invite message, and the connection rejection message is a SIP reject message.

Although described in terms of a CDMA2000 1x wireless network and an LTE wireless network, the embodiments disclosed herein can be extended to include GSM networks and UMTS networks as well.

BRIEF DESCRIPTION OF THE DRAWINGS

The described embodiments and the advantages thereof may best be understood by reference to the following description taken in conjunction with the accompanying drawings.

DETAILED DESCRIPTION OF SELECTED EMBODIMENTS

Figure 1:
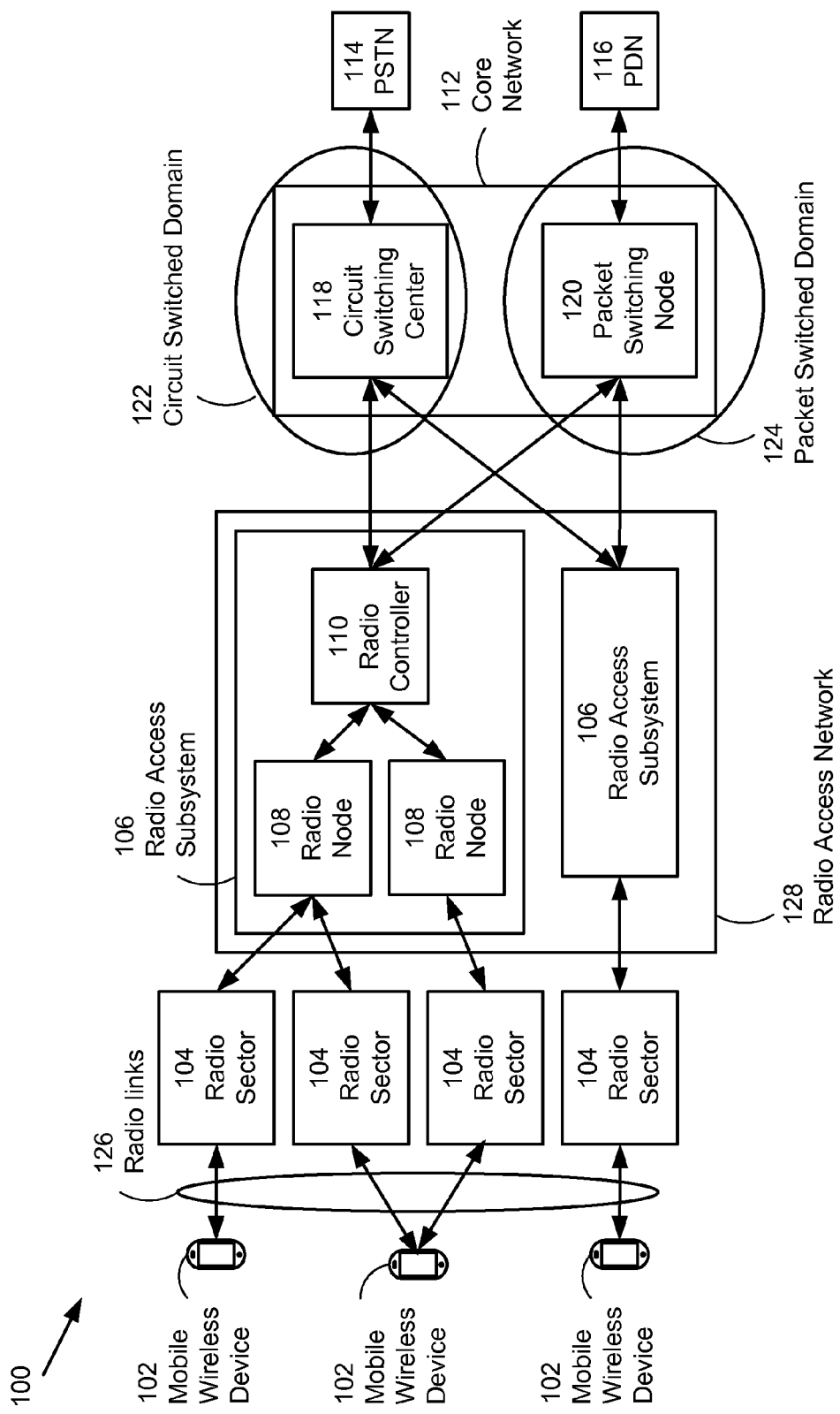
FIG. 1 illustrates components of a generic wireless communication network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The examples and embodiments provided below describe various methods and apparatuses for managing connectivity in a wireless mobile wireless device, and in particular to connecting a mobile wireless device that has a single receiver to a plurality of wireless communication networks that use different wireless communication technologies, such as to an LTE wireless network and a CDMA2000 1x wireless network. It should be understood, however, that other implementations of the same methods and apparatuses can apply to mobile wireless devices used in other types of wireless networks. For example, the same teachings could also be applied to a GSM network and a UMTS network or to other wireless networks using voice and packet data wireless communications. In general, the teachings described herein can apply to a mobile wireless device operating in a wireless network based on radio access technology. The specific examples and implementations described herein are presented for simplicity in relation to an LTE wireless network interworking with a CDMA2000 1x wireless network but also can apply to other wireless network environments that use different wireless communication technologies in parallel. For example, the LTE wireless network can also be an LTE Advanced wireless network and the CDMA2000 1x wireless network can include the capability of a CDMA2000 EV-DO wireless network.

Wireless communication network deployments continue to evolve as wireless communication network technology advances and new or updated wireless communication protocols are standardized. Circuit switched networks continue to offer voice services while packet switched networks expand from data oriented services to include a multiplicity of services including video and packet voice. Wireless mobile wireless devices also continue to increase in functionality to supplement voice connections with multimedia internet connectivity. A typical "smart phone" can include wireless circuitry that can communicate over several different types of wireless networks including short range wireless, e.g. Bluetooth, medium range wireless, e.g. WiFi, and long range wireless, e.g. GSM/GPRS, UMTS, CDMA2000 1x/EV-DO and LTE/LTE-Advanced. Each wireless receiver in a mobile wireless device can consume significant amounts of battery power and can occupy a portion of limited board space available inside the mobile wireless device. In a mobile wireless device designed to a particular form factor, manufacturing cost point, and/or power consumption requirement based on a level of integrated circuitry available, a single long range wireless receiver can be preferred over including multiple long range wireless receivers in the mobile wireless device. A multiple long range wireless receiver mobile wireless device can connect to multiple long range wireless networks that can each use different wireless technologies, in some cases simultaneously; however a single long range wireless receiver device can connect to only one long range wireless network at a time. Providing a capability to switch between multiple long range wireless networks seamlessly with minimal service interruptions on a single receiver device can be desired.

Different wireless communication networks can use different wireless communication technologies. With a dual receiver mobile wireless device, separate sets of receiver circuitry can enable the dual receiver mobile wireless device to connect to the different wireless communication networks independently (and in some cases simultaneously). The dual receiver mobile wireless device can be actively connected to one of the wireless networks, such as an LTE wireless network, using one receiver and can receive pages from a second wireless network, such as a CDMA2000 1x wireless network through a second receiver. In this case, the dual receiver mobile wireless device can be provide a user of the device a data connection to the internet over the LTE wireless network and still receive mobile terminated voice connections through the CDMA2000 1x wireless network. Wireless network providers can deploy new wireless communication technology over many years, and mobile wireless devices capable of connecting using different wireless communication standards can be required during transitional periods, particularly as voice services migrate from circuit switched networks, such as a CDMA2000 1x wireless network, to packet switched networks, such as an LTE wireless network.

A mobile wireless device can include a single receiver through which signals can be received from a first wireless network or from a second wireless network individually but not simultaneously. The first and second wireless networks can be connected together between elements of their access network portions or their core network portions or both. In a representative embodiment, the first wireless network can be an LTE wireless network and the second wireless network can be a CDMA2000 1x wireless network. To notify each wireless network of its presence, the single receiver mobile wireless device can perform an IP Multimedia Subsystem (IMS) registration on the LTE wireless network and can also perform and maintain a simultaneous registration with the CDMA2000 1x wireless network. As a normal mode of operation, the mobile wireless device can maintain an "idle mode" association with the CDMA2000 1x wireless network through the registration but can avoid periodically monitoring pages from the CDMA2000 1x wireless network during paging intervals using the single receiver. Thus the single receiver mobile wireless device need not periodically listen for pages transmitted by the CDMA2000 1x wireless network when camped on the LTE wireless network. The LTE wireless network can provide a connection request to the mobile wireless device, and the mobile wireless device can determine whether a connection is required on the LTE wireless network or on the parallel CDMA2000 1x wireless network in response to the connection request.

The single receiver mobile wireless device can maintain the "idle mode" state in the CDMA2000 1x wireless network by performing any required re-registrations as the mobile wireless device traverses through different registration zones of the CDMA2000 1x wireless network. A change in registration zone for the CDMA2000 1x wireless network can be determined by monitoring the physical location of the single receiver mobile wireless device through one or more different means. The single receiver mobile wireless device can include a global positioning system (GPS) receiver through which it can maintain knowledge of its own location and reference that location with respect to a database of registration zones for the CDMA2000 1x wireless network. The location of the single receiver mobile wireless device can also be estimated using knowledge of nearby cell sites and/or WiFi access points with knowledge also of their locations. After determining a change in physical location of the single receiver mobile wireless device that traverses boundaries of registration zones, the single receiver mobile wireless device can tune its single receiver from the LTE wireless network to the CDMA2000 1x wireless network to re-register in the new registration zone of the CDMA2000 1x wireless network. Alternatively, the single receiver mobile wireless device can periodically tune away its receiver from the LTE wireless network to the CDMA2000 1x wireless network to determine if the registration zone has changed. This periodic tuning away can be significantly less frequent than the frequency of paging cycles for the CDMA2000 1x network. The single receiver mobile wireless device need not monitor the periodic paging channel of the CDMA2000 1x wireless network based on the paging occasion according to the single receiver mobile wireless device's slot cycle index. Instead, the single receiver mobile wireless device can be notified of an incoming connection request over IMS through the eUTRAN of the LTE wireless network. Notification to the single receiver mobile wireless device can be sent by the LTE wireless network using a session initiation protocol (SIP) invite, for example, or through other similar means.

After being notified over the LTE wireless network of the incoming connection request, the single receiver mobile wireless device can tune its single receiver from the LTE wireless network to the CDMA2000 1x wireless network and can monitor the paging channel of the CDMA2000 1x wireless network during one or more paging intervals. Although the single receiver mobile wireless device can be notified of the incoming connection request through the LTE wireless network, no connection establishment using IMS need be completed through the LTE wireless network, and instead a circuit switched connection can be established through the parallel CDMA2000 1x wireless network. After tuning its single receiver to the CDMA2000 1x wireless network, the mobile wireless device can be able to receive pages from the CDMA 2000 1x network and can complete a circuit switched voice connection with the CDMA 2000 1x network. After the circuit switched voice connection on the CDMA2000 1x wireless network ends, the single receiver mobile wireless device can revert to a "normal" mode of operation in which the single receiver mobile wireless device can be camped on the eUTRAN of the LTE wireless network and can perform any required re-registrations on the CDMA2000 1x wireless network.

When the single receiver mobile wireless device initiates a mobile originated (MO) voice connection, the single receiver mobile wireless device can camp on the CDMA2000 1x wireless network and initiate a connection as described in the relevant 3GPP2 specification. The mobile wireless device can tune its single receiver from the LTE wireless network to the CDMA2000 1x wireless network without terminating an ongoing connection with the LTE wireless network. When the mobile originated voice connection terminates, the mobile wireless device can re-tune the single receiver back to the LTE wireless network and re-establish any lost connections, such as a radio resource control (RRC) connection with the LTE wireless network.

These and other embodiments are discussed below with reference to FIGS. 1-15. However, those skilled in the art will readily appreciate that the detailed description given herein with respect to these figures is for explanatory purposes only and should not be construed as limiting.

FIG. 1 illustrates a representative generic wireless communication network 100 that can include multiple mobile wireless devices 102 connected by radio links 126 to radio sectors 104 provided by a radio access network 128. Each radio sector 104 can represent a geographic area of radio coverage emanating from an associated radio node 108 using a radio frequency carrier at a selected frequency. Radio sectors 104 can have different geometric shapes depending on antenna configuration, such as radiating outward in an approximate circle or hexagon from a centrally placed radio node 108 or cone shaped for a directional antenna from a corner placed radio node 108. Radio sectors 104 can overlap in geographic area coverage so that the mobile wireless device 102 can receive signals from more than one radio sector 104 simultaneously. Each radio node 108 can generate one or more radio sectors 104 to which the mobile wireless device 102 can connect by one or more radio links 126.

In some wireless networks 100, the mobile wireless device 102 can be connected to more than one radio sector 104 simultaneously. The multiple radio sectors 104 to which the mobile wireless device 102 is connected can come from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the mobile wireless device 102 to the radio access network 128.

The radio access network 128, which provides radio frequency air link connections to the mobile wireless device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
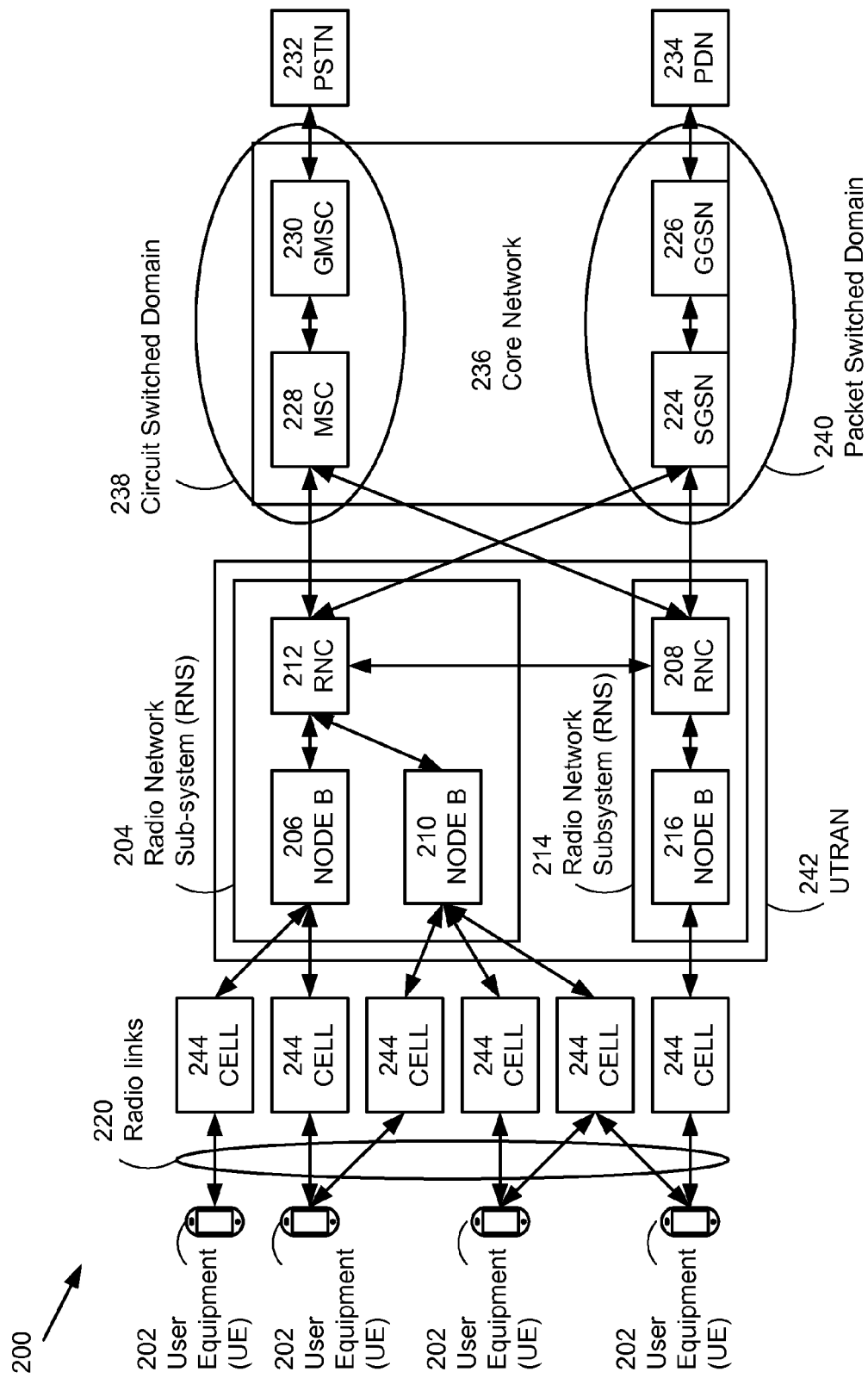
FIG. 2 illustrates components of a UMTS wireless communication network.

FIG. 2 illustrates a representative UMTS wireless communication network 200 that can include one or more user equipment (UE) 202 that can communicate with a UMTS terrestrial radio access network (UTRAN) 242 that can connect to a core network (CN) 236. The core network 236 can include a circuit switched domain 238 that can connect the UE 202 to a public switched telephone network (PSTN) 232 and a packet switched domain 240 that can connect the UE 202 to a packet data network (PDN) 234. The UTRAN 242 can include one or more radio network sub-systems (RNS) 204/214 each of which can include a radio network controller (RNC) 208/212 and one or more Node-Bs (base stations) 206/210/216 managed by a corresponding RNC. The RNC 208/212 within the UTRAN 242 can be interconnected to exchange control information and manage packets received from and destined to the UE 202. Each RNC 208/212 can handle the assignment and management of radio resources for the cells 244 through which the UE 202 connect to the wireless network 200 and can operate as an access point for the UE 202 with respect to the core network 236. The Node-B 206/210/216 can receive information sent by the physical layer of UE 202 through an uplink and transmit data to UE 202 through a downlink and can operate as access points of the UTRAN 242 for UE 202.

UTRAN 242 can construct and maintain a radio access bearer (RAB) for communication between UE 202 and the core network 236. Services provided to a specific UE 202 can include circuit switched (CS) services and packet switched (PS) services. For example, a general voice conversation can be transported through a circuit switched service, while a Web browsing application can provide access to the World Wide Web (WWW) through an internet connection that can be classified as a packet switched (PS) service. To support circuit switched services, the RNC 208/212 can connect to the mobile switching center (MSC) 228 of core network 236, and MSC 228 can be connected to gateway mobile switching center (GMSC) 230, which can manage connections to other networks, such as the PSTN 232. To support packet switched services, the RNC 208/212 can also be connected to serving general packet radio service (GPRS) support node (SGSN) 224, which can connect to gateway GPRS support node (GGSN) 226 of core network 236. SGSN 224 can support packet communications with the RNC 208/212, and the GGSN 226 can manage connections with other packet switched networks, such as the PDN 234. A representative PDN 234 can be the "Internet".

Figure 3:
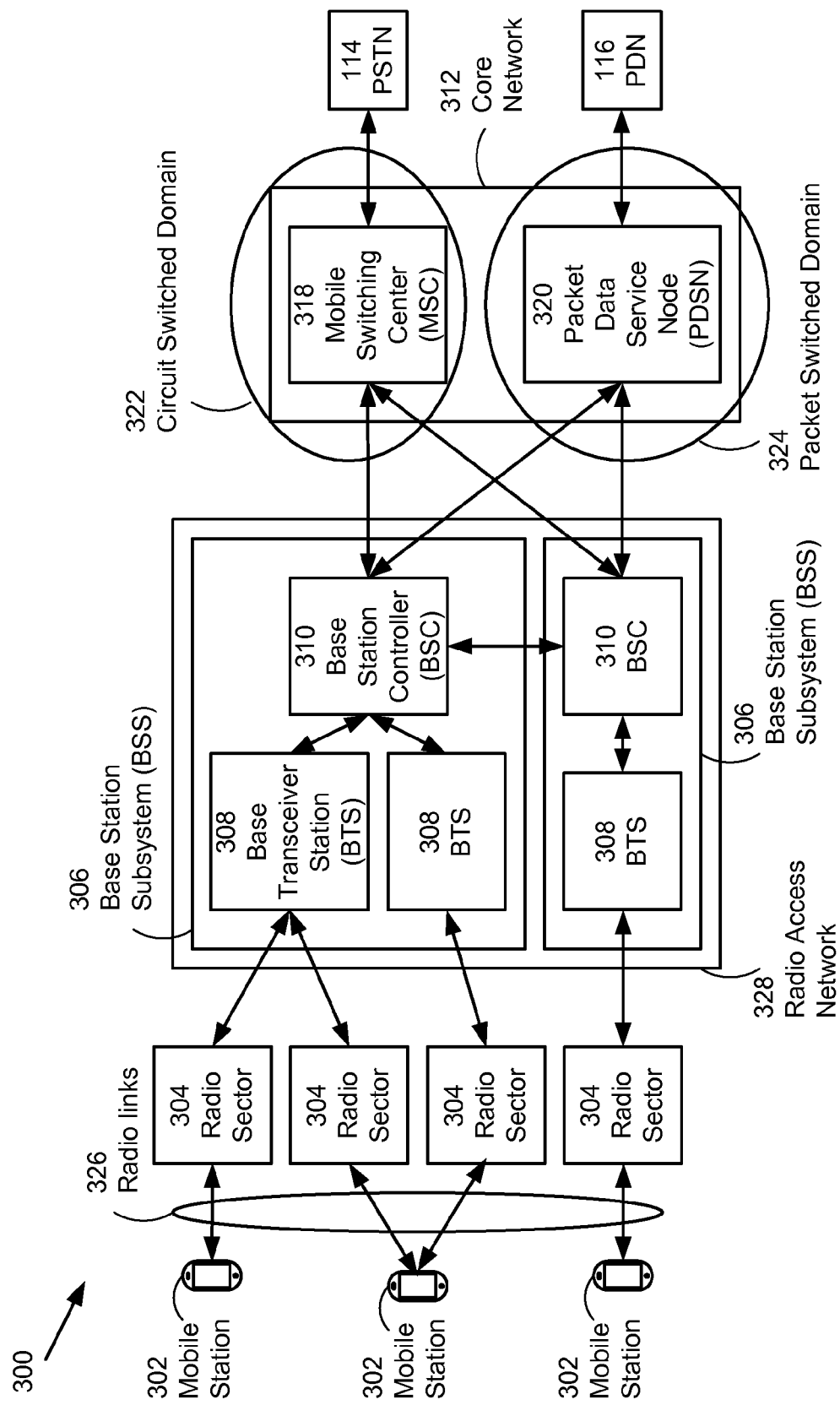
FIG. 3 illustrates components of a CDMA2000 1x wireless communication network.

FIG. 3 illustrates a representative CDMA2000 1x wireless network 300 that can include elements comparable to those described earlier for the generic wireless network 100 and the UMTS wireless network 200. Multiple mobile stations 302 can connect to one or more radio sectors 304 through radio frequency links 326. Each radio sector 304 can radiate outward from a base transceiver station (BTS) 308 that can connect to a base station controller (BSC) 310, together forming a base station subsystem (BSS) 306. Multiple base station subsystems 306 can be aggregated to form a radio access network 328. Base station controllers 310 in different base station subsystems 306 can be interconnected. The base station controllers 310 can connect to both a circuit switched domain 322 that use multiple mobile switching centers (MSC) 318 and a packet switched domain 324 formed with packet data service nodes (PDSN) 320, which together can form a core network 312 for the wireless network 300. As with the other wireless networks 100/200 described above, the circuit switched domain 322 of the core network 312 can interconnect to the PSTN 114, while the packet switched domain 324 of the core network 312 can interconnect to the PDN 116.

Figure 4:
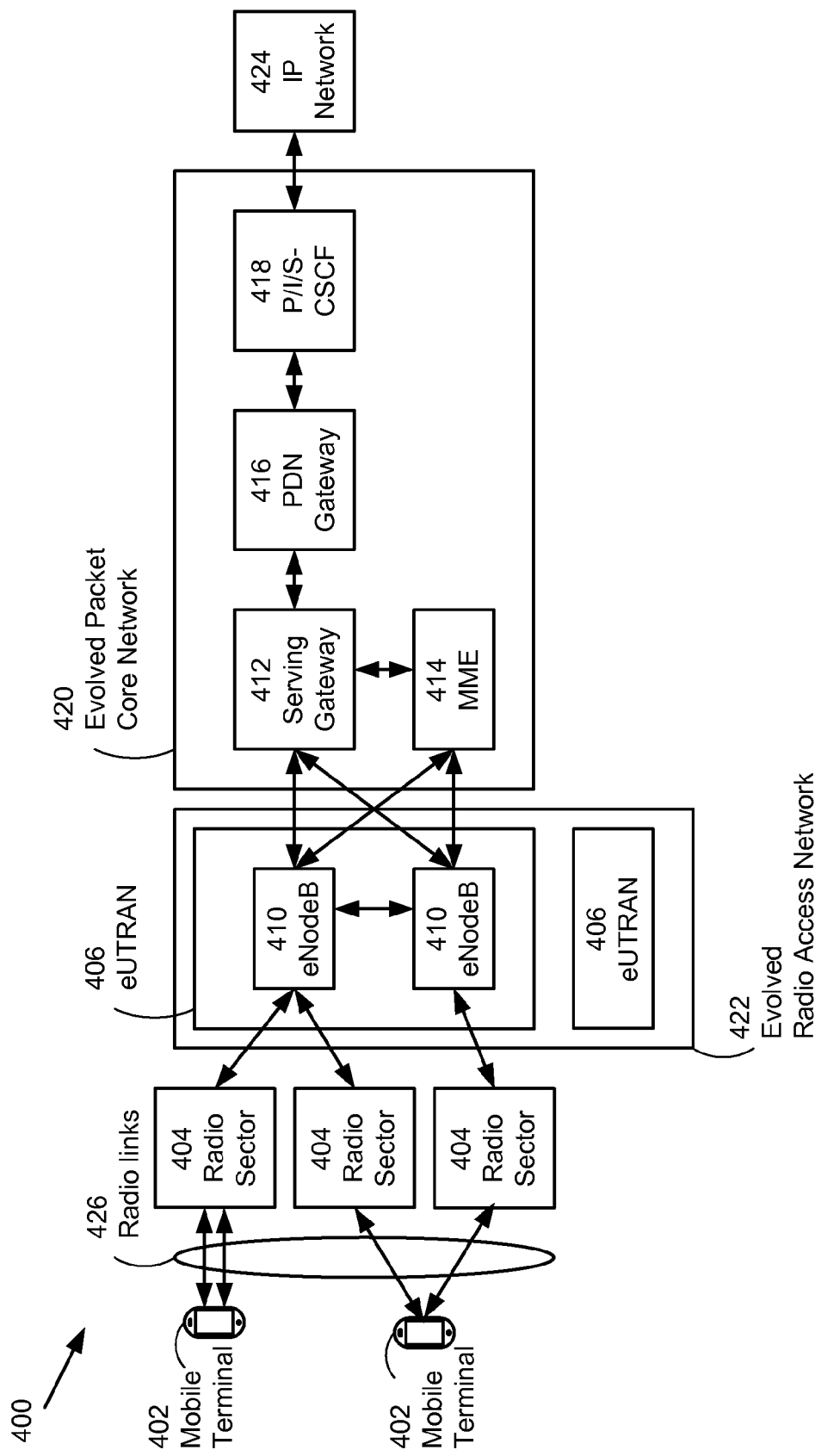
FIG. 4 illustrates components of a LTE wireless communication network.

FIG. 4 illustrates a representative Long Term Evolution (LTE) wireless network 400 architecture designed as a packet switched network exclusively. A mobile terminal 402 can connect to an evolved radio access network 422 through radio links 426 associated with radio sectors 404 that emanate from evolved Node B's (eNodeB) 410. The eNodeB 410 includes the functions of both the transmitting and receiving base stations (such as the Node B 206 in the UMTS network 200 and the BTS 308 in the CDMA2000 network 300) as well as the base station radio controllers (such as the RNC 212 in the UMTS network 200 and the BSC 310 in the CDMA2000 network 300). The equivalent core network of the LTE wireless network 400 is an evolved packet core network 420 including serving gateways 412 that interconnect the evolved radio access network 422 to public data network (PDN) gateways 416 that connect to external internet protocol (IP) networks 418. Multiple eNodeB 410 can be grouped together to form an evolved UTRAN (eUTRAN) 406. The eNodeB 410 can also be connected to a mobility management entity (MME) 414 that can provide control over connections for the mobile terminal 402.

As a packet switched only network, the LTE wireless network 400 can require either a packet voice service, such as a voice over LTE (VoLTE) service to provide voice connections through the LTE wireless network 400 to the mobile terminal 402, or a circuit switched fall back (CSFB) service. In some areas, as the wireless networks evolve during deployment, neither a VoLTE or CSFB service can be supported by either the LTE wireless network 400 or by the mobile terminal 402 (or both). In this case, packet switched services can provide "data" connectivity, while circuit switched services on a parallel wireless network, such as the CDMA2000 1x wireless network 300, can provide voice services. The mobile wireless device must be capable of connecting on both the LTE wireless network 400 and the CDMA2000 1x wireless network 300 to offer the user a full complement of services, although connectivity to both wireless networks simultaneously need not be required. When configured with only a single receiver, the mobile wireless device can be "idly" camped on or "actively" connected to only one wireless network at a time. The single receiver mobile wireless device can be unable to receive pages directly from the network on which it is not camped or connected; however, an indirect method to indicate the availability of pages for the other network can be provided by the current network as described herein. By rapidly switching when required between an LTE wireless network 400 over which packet oriented data connections can exist to the CDMA2000 1x wireless network 300 over which mobile originated or mobile terminated circuit switched oriented voice connections can be established can provide the single receiver mobile wireless device non-simultaneous voice and data connectivity over wireless networks that use different wireless communication protocols.

Figure 5:
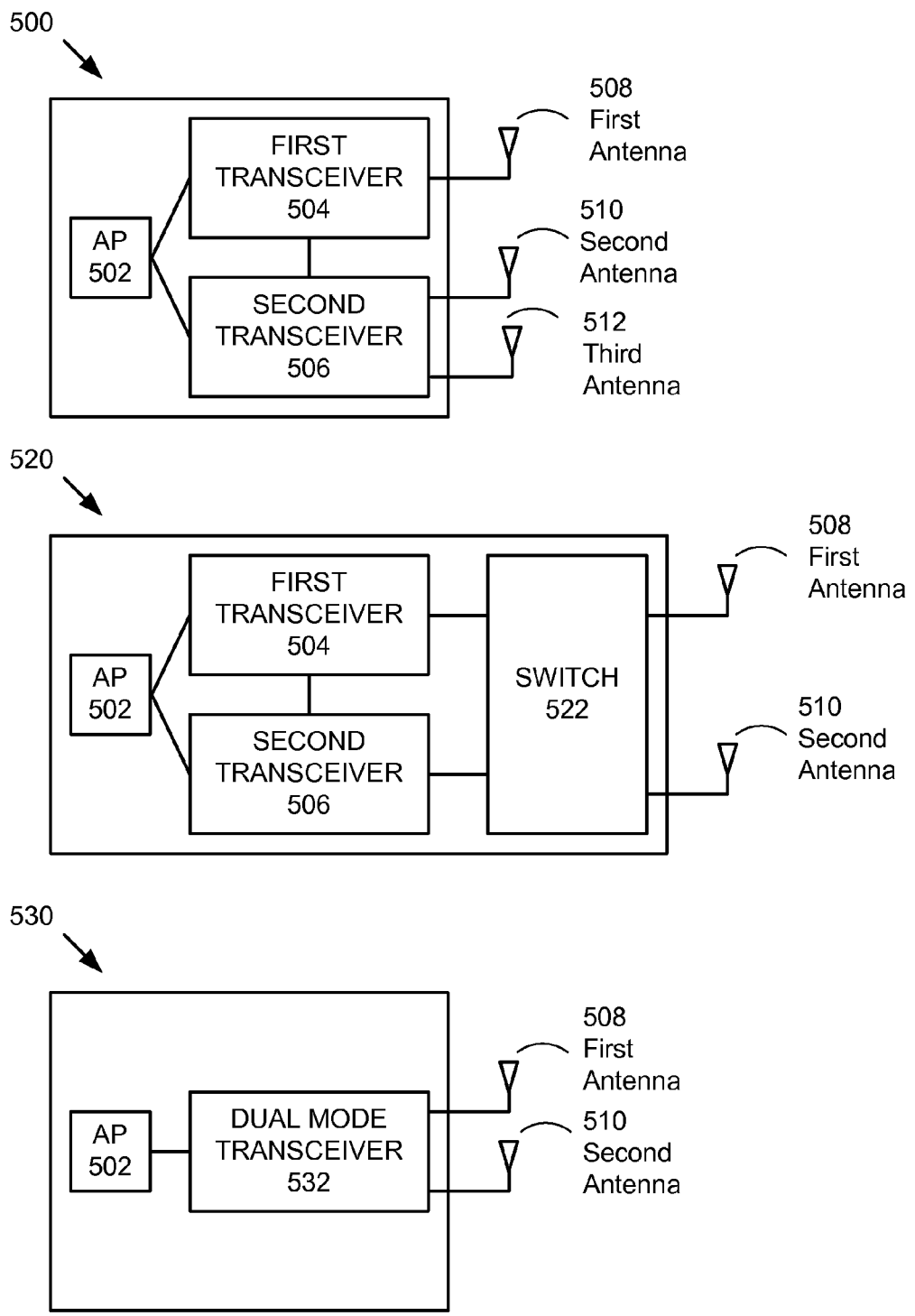
FIG. 5 illustrates several representative architectures for a mobile wireless communication device.

FIG. 5 illustrates select elements for several different architectures that can be used in a mobile wireless device. A dual receiver mobile wireless device 500 can include a first transceiver 504 that can process signals according to a first wireless communication protocol and a second transceiver 506 that can process signals according to a second wireless communication protocol. The first transceiver 504 can be interconnected to the second transceiver 506 to provide control information between them enabling coordinated transmission and reception to minimize interference. Both the first transceiver 504 and the second transceiver 506 can be connected to an application processor (AP) 506 that can provide higher layer functions, such as requesting establishment and release of connections for various resident application services. The transceivers 504/506 can provide the lower layer functions that can support the transport of data for the higher layer services ordered by the application processor 502. The first transceiver 504 as shown can be connected to a first antenna 508 that can transmit and receive signals according to the first wireless communication protocol. The second transceiver 506 can be connected to a second antenna 510 and a third antenna 512 that can transmit and receive signals according to a second wireless communication protocol. The use of multiple antennas for certain wireless communication protocols can provide improved performance (e.g. higher data rates and/or better immunity to noise/interference) compared to a single antenna configuration. For example, a multiple input multiple output (MIMO) scheme can be used for mobile terminals 402 connected to the LTE wireless network 400. The dual transceiver architecture shown for the mobile wireless device 500 can provide the capability to connect to one wireless network, such as the LTE wireless network 400 through one of the transceivers, e.g. the second transceiver 506, while still receiving pages from another wireless network, such as the CDMA2000 1x wireless network 300 through another transceiver, e.g. the first transceiver 504.

FIG. 5 illustrates a second dual receiver mobile wireless device 520 having an arrangement to share the first antenna 508 and the second antenna 510 between the first transceiver 504 and the second transceiver 506 through a switching network 522. When the wireless communication protocols for the transceivers 504/506 can require only one antenna each, then both transceivers 504/506 can operate simultaneously with each transceiver 504/506 connected to a single one of the antennas 508/510. When the communication protocol for at least one of the transceivers 504/506 requires both of the antennas 508/510 for operation, the second dual receiver mobile wireless device 520 can alternate between transceivers for separate connections. The switch 522 can provide the flexibility to connect the antennas 508/510 to one or both of the transceivers 504/506 at any time.

Multiple transceivers 504/506 can require more space and can consume additional power in the mobile wireless device, and a multi-functional single receiver mobile wireless device 530 can be more compact and power efficient. The single receiver mobile wireless device 530 can include a dual mode transceiver 532 connected to the first and second antennas 508/510 and can provide the capability to connect to two different wireless networks individually but not simultaneously, particularly when at least one of the wireless networks can require the use of multiple antennas, such as an LTE wireless communications protocol that mandates the use of at least two receivers in a mobile wireless terminal 402. When connected to the LTE wireless network 400, the dual mode transceiver 532 can use both antennas 508/510 for transmission and reception of radio frequency signals. By an indirect signaling method, the dual mode transceiver 532 can receive notice that a separate CDMA2000 1x wireless network 300 seeks to make a connection with the single receiver mobile wireless device 530. Direct reception of pages from the CDMA2000 1x wireless network 300 intended for the single receiver mobile wireless device 530 can be not received when the dual mode transceiver 532 is tuned to a radio frequency required for the LTE wireless network 400. To connect to the separate CDMA2000 1x wireless network 300, the dual mode transceiver 532 can partially or wholly sever connections with the LTE wireless network 400 and tune the dual mode transceiver 532 to a radio frequency appropriate for the CDMA2000 1x wireless network 300, which can differ from radio frequencies used for the LTE wireless network 400. Upon completion of the connection with the CDMA2000 1x wireless network 300, the mobile wireless device 530 can re-tune the dual mode transceiver 532 to a radio frequency required for the LTE wireless network 400 and re-establish a connection if required. Establishing and releasing connections, as well as changing between wireless networks that use different wireless technologies can be summarized in several state transition diagrams as follows next.

Figure 6:
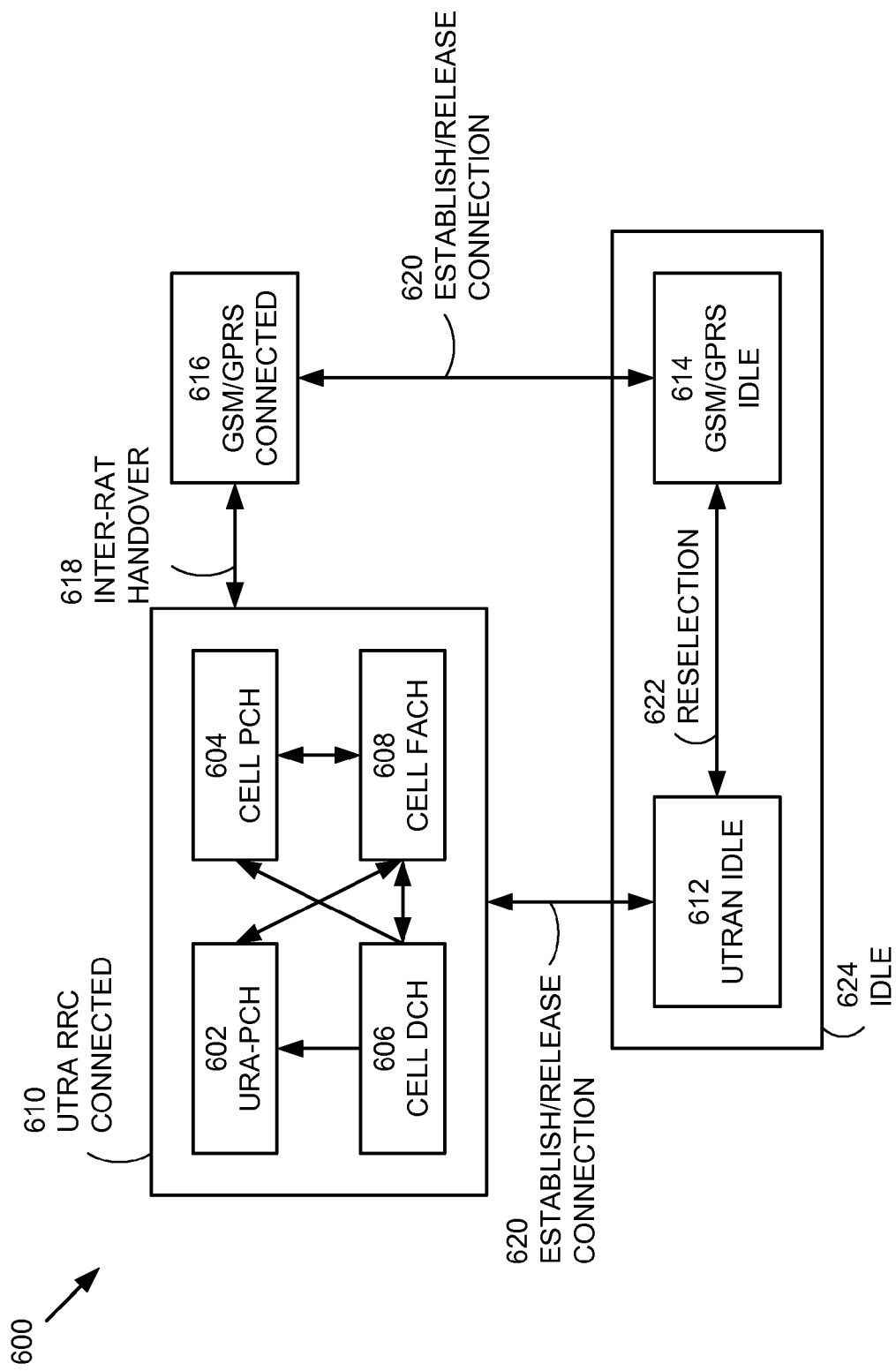
FIG. 6 illustrates a state transition diagram for a mobile wireless communication device for a UMTS wireless network and a GSM wireless network.

FIG. 6 illustrates a state transition diagram 600 having several states for a radio resource control (RRC) portion of a protocol stack for a UE 202 in a combined UMTS/GSM network. The UE 202 can be in an unconnected IDLE state 624, in a UTRA RRC connected state 610 or in a GSM connected state 616. In IDLE state 624, UE 202 can request an RRC connection to establish radio resources for communication with a wireless network whenever data is available to exchange between UE 202 and the UTRAN 242. Establishing the RRC connection can occur when an application on UE 202 requires a connection to send data or retrieve data from the network, when initiating a mobile voice connection, and when terminating a connection for the UE 202 after receiving a page on a paging channel from the UTRAN 242 or SGSN 224 indicating data available from an external data network. Once UE 202 has sent a request to UTRAN 242 to establish a radio connection, UTRAN 242 can choose a state for the RRC connection. The UTRA RRC connected state can include four separate states, CELL_DCH state 606, CELL_FACH state 608, CELL_PCH state 604 and URA_PCH state 602.

From a UTRAN "idle" state 612 within the IDLE state 624, UE 202 can transition to the CELL_FACH state 608, in which it can make an initial data transfer, subsequent to which the wireless network can determine which RRC connected state to use for continued data transfer. The wireless network can move UE 202 into the Cell Dedicated Channel (CELL_DCH) state 606 or keep UE 202 in the Cell Forward Access Channel (CELL_FACH) state 608. In CELL_DCH state 606, a dedicated channel can be allocated to UE 202 for both uplink and downlink to exchange data. The CELL_DCH state 606, with a dedicated physical channel allocated to UE 202, can typically consume more battery power from UE 202 than the other states, and significantly more battery power than the IDLE state 624. Alternatively, rather than place the UE 202 in the CELL_DCH state, UTRAN 242 can maintain UE 202 in a CELL_FACH state 608. In a CELL_FACH state 608 no dedicated channel can be allocated to UE 202. Instead, common channels can be used to send signaling in relatively small bursts of data. However, UE 202 can continue to monitor common channels in the CELL_FACH state 608, and therefore the UE 202 can consume more battery power than in select alternative states, namely CELL_PCH state 604 and URA_PCH state 602, as well as compared to IDLE state 624. The UE 202 can transition between the UTRAN "idle" state 612 to the GSM/GPRS "idle" state 614 through a process known as reselection 622. The reselection 622 process can include retuning a single transceiver in a mobile wireless device between different frequencies and also using different algorithms and methods to transmit and send signals, as the different networks can use completely different communications protocols. The UE 202 can also transition between the UTRA "RRC connected" state 610 to the GSM/GPRS "connected" state 616 through a process referred to as inter-radio access technology (RAT) handover 618. For certain wireless communication protocols, a handover between one wireless network using one wireless communications technologies and a second wireless network using a different wireless technology can occur while maintaining an active connection. For other wireless communication protocols, the handover can occur only in an idle state, i.e. active connections cannot be maintained upon handover, which can thus require releasing and establishing connections (transitions 620). For a single receiver mobile wireless device 530, an active connection on a first wireless network can be released, suspended or dropped indirectly (e.g. non-responsive timeout) when transitioning the transceiver from a from the first wireless network to a second wireless network. When returning to the first wireless network, connections can be re-established. If the two wireless networks permit a seamless transition, an inter-RAT handover 618 between connected states can be possible allowing for the time required to transition the internal circuitry between different wireless communication technologies.

Figure 7:
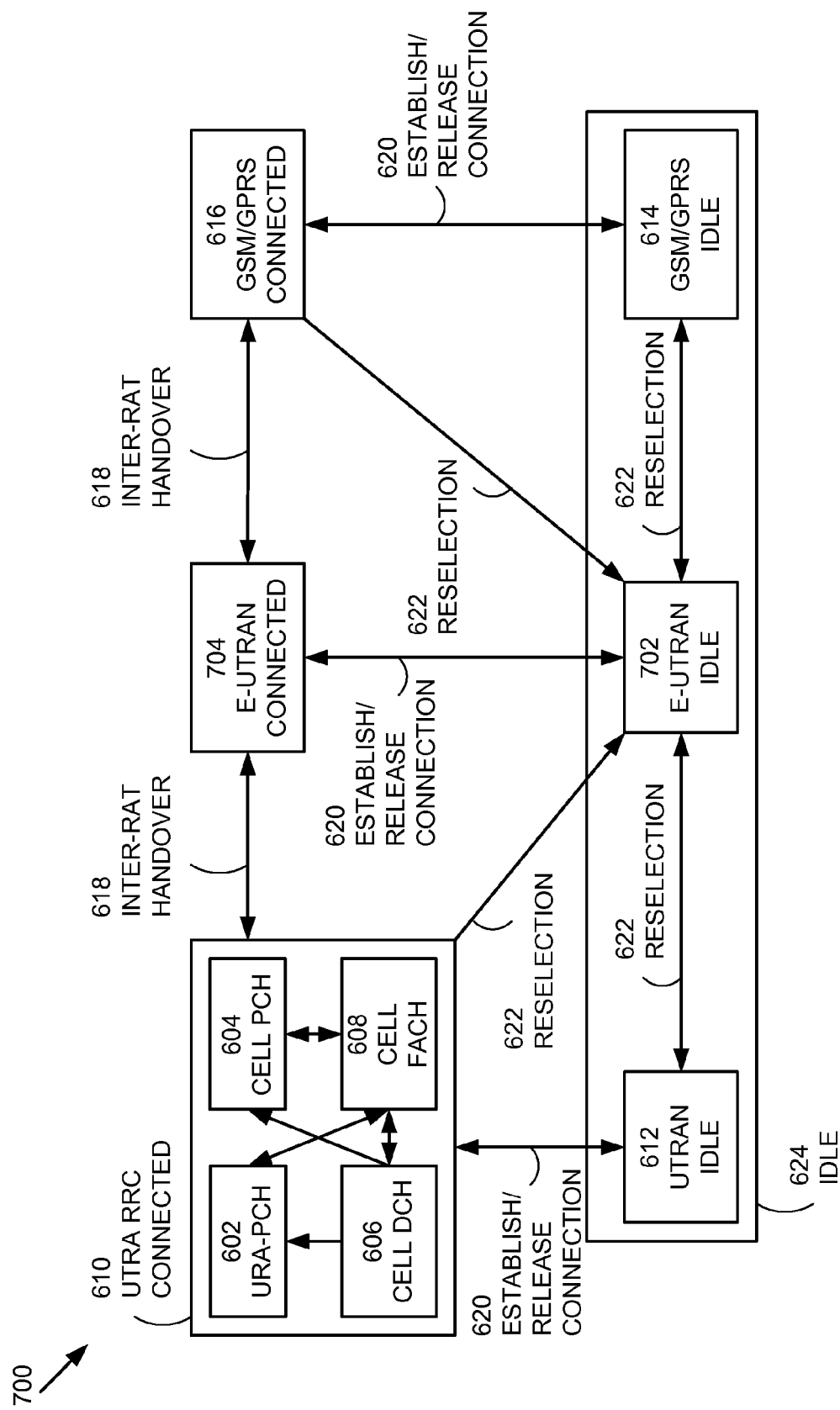
FIG. 7 illustrates a state transition diagram for a mobile wireless communication device for a UMTS wireless network, an LTE wireless network and a GSM wireless network.

FIG. 7 extends the state transition diagram of FIG. 6 to include states for the LTE wireless network 400. Transitions between an active E-UTRAN connected state 704 and the connected states of the GSM/UMTS networks can be accomplished through inter-RAT handovers 618. Transitions between the E-UTRAN connected state 704 and the E-UTRAN idle state 702 can be effected by establishing and releasing connections 620. Transitions between the E-UTRAN idle state 702 and the idle states of the GSM/GPRS/UMTS networks can use reselection 622 processes. In addition to transitions between connected states and between idle states, a mobile wireless device can also transition from a UTRA RRC connected state 610 or a GSM/GPRS connected state 616 to a E-UTRAN idle state 702 by reselection 622.

Figure 8:
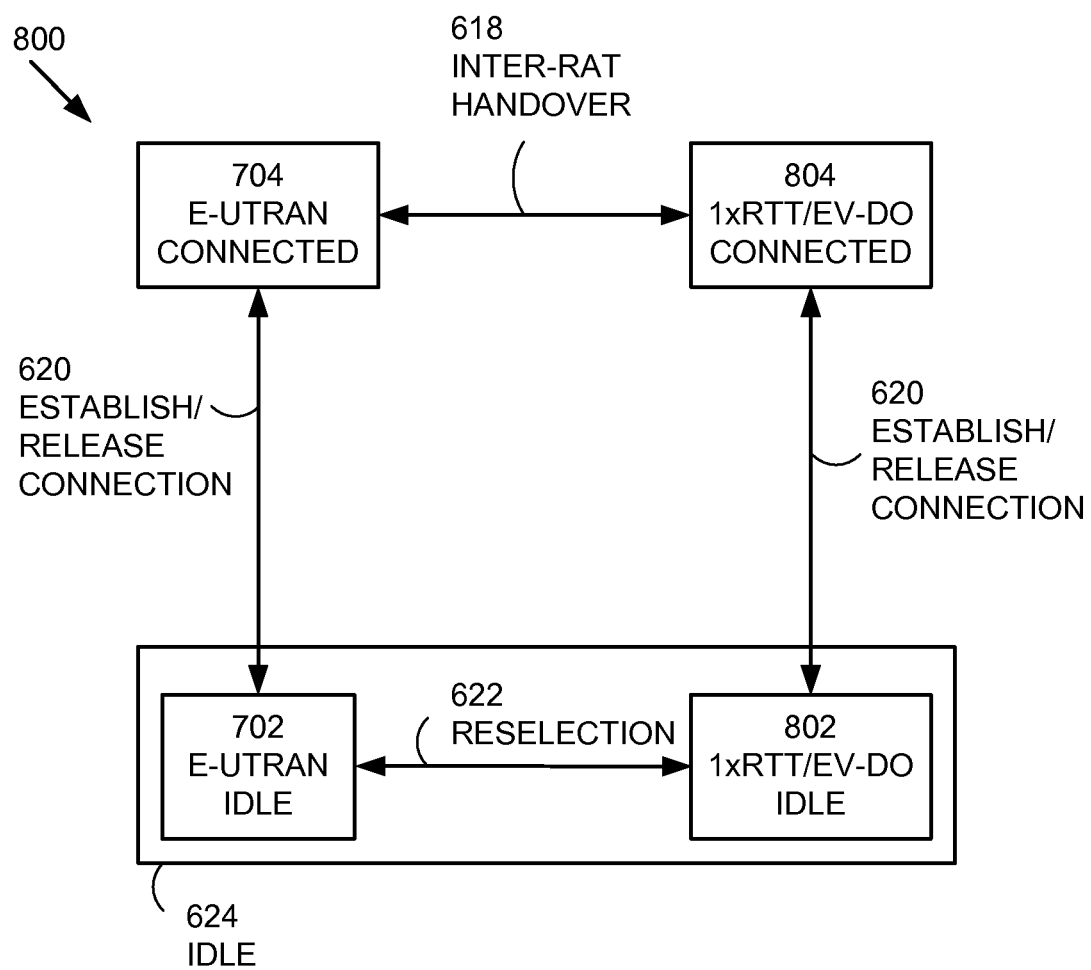
FIG. 8 illustrates a state transition diagram for a mobile wireless communication device for an LTE wireless network and a CDMA2000 1x wireless network.

FIG. 8 illustrates a state transition diagram between states in an LTE wireless network 400 and in a CDMA2000 1x wireless network 300. A mobile wireless device in the CDMA2000 1x wireless network 300 can be in a 1xRTT/EV-DO idle state 802 and can establish and release connections 622 to transition between the 1xRTT/EV-DO idle state 802 and a 1xRTT/EV-DO connected state 804. Transition between the 1xRTT/EV-DO idle state 802 and the E-UTRAN IDLE state 702 can be realized through a reselection 622 process, while transition between the 1xRTT/EV-DO connected state 804 can be realized using the inter-RAT handover 618 procedure. The inter-RAT handover 618 permits maintaining a current connection while transitioning between two networks that use two different wireless communication protocols. When establishing a new separate connection using a different wireless communication protocol, a dual transceiver mobile wireless device can use the second transceiver to establish the new connection; however a single transceiver mobile wireless device can only communicate with one network at a time. As such, in order to change from a connected state on a first wireless network to a connected state on a second wireless network, the single transceiver mobile wireless device can transition from a connected state on the first wireless network to an idle state (e.g. by releasing the connection) and then reselect to the second wireless network before establishing a new connection with the second wireless network.

Figure 9:
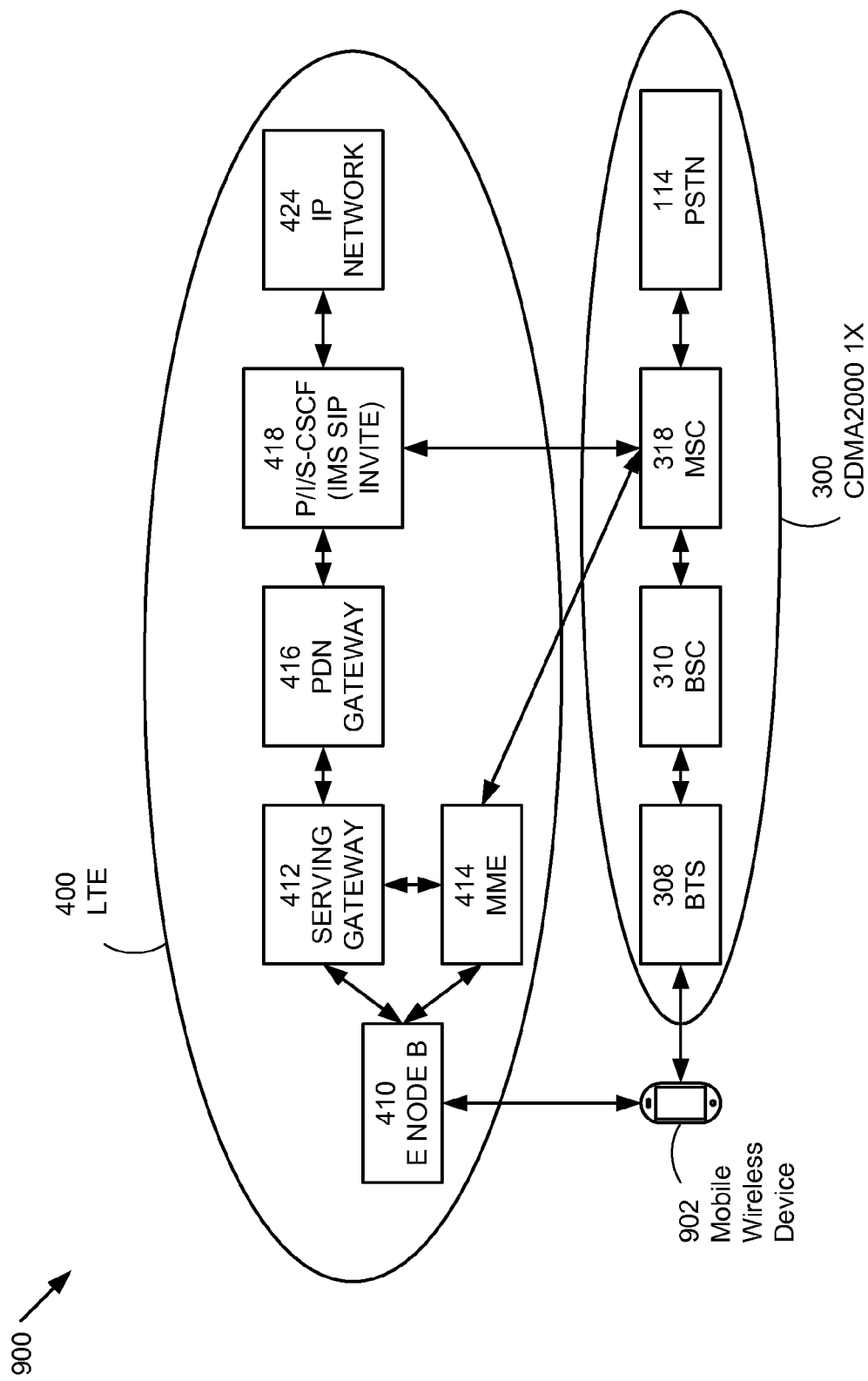
FIG. 9 illustrates a mobile wireless device connected to both an LTE wireless network and to a CDMA2000 1x wireless network.

FIG. 9 illustrates a mobile wireless device 902 capable of communicating with the LTE wireless network 400 and also communicating with the CDMA2000 1x wireless network 300 through radio links 426 to the E Node B 410 in the LTE wireless network 400 or through radio links 326 to the BTS 308 in the CDMA2000 1x wireless network 300 respectively. When connected to the LTE wireless network 400, the mobile wireless device 902, which can contain only a single transceiver and can therefore be able to connect actively to only one wireless network at a time, can be unable to receive pages that include a connection request to the mobile wireless device 902 from the CDMA2000 1x wireless network 300. The CDMA2000 1x wireless network 300, however, can be interconnected with the LTE wireless network 400 through one or more connections between elements of their respective core networks 312/420. In particular the mobility management entity (MME) 414 in the LTE wireless network 400 can provide control functions for mobility of the mobile wireless device 902 between the LTE wireless network 400 and the CDMA2000 1x wireless network 300. The mobile wireless device 902 can be registered with the MME 414 on the LTE wireless network 400. The MME 414 can provide tracking and paging of the mobile wireless device 902 when registered with the LTE wireless network 400. When seeking to establish radio access bearers for the mobile wireless device 902 in the LTE wireless network 400 or to provide handovers within the LTE wireless network 400 between different E Node Bs 410, the MME 414 can also interact with the E Node B 410 and the serving gateway 412.

If the mobile wireless device 902 is camped on or connected to the LTE wireless network 400 and a voice call connection request occurs on the CDMA2000 1x wireless network 300, the mobile switching center (MSC) 300 in the CDMA2000 1x wireless network 300 can provide an indication of the incoming voice connection request to the MME 414. Through a mechanism known as circuit switched fallback (CSFB), the mobile wireless device 902 can transition from the LTE wireless network 400 over to the CDMA2000 1x wireless network 300 to receive the incoming voice connection request on the CDMA2000 1x wireless network 300. CSFB allows a mobile wireless device 902 registered on the LTE wireless network 400 to be "known" to the CDMA2000 1x wireless network 300, i.e. the MME 414 in the LTE wireless network 400 can register the mobile wireless device 902 with the MSC 300 in the CDMA2000 1x wireless network 300. While the indication of an incoming voice connection request to the mobile wireless device 902 can occur through the LTE wireless network 400, the actual circuit switched voice connection can occur through the CDMA2000 1x wireless network 300. If the mobile wireless device 902 is actively connected to the LTE wireless network 400, the MME 414 can forward to incoming voice connection request to the mobile wireless device 902, which can respond affirmatively or deny the request. If the mobile wireless device 902 is in an idle mode in the LTE wireless network 400, then the LTE wireless network 400 can page the mobile wireless device 902, thereby establishing an RRC connection for signaling the voice connection request from the CDMA2000 1x wireless network 300 to the mobile wireless device 902. In either case, the mobile wireless device 902 can then terminate (or suspend) any current data and signaling connections with the LTE wireless network 400 in order to switch its single transceiver over to the CDMA2000 1x wireless network 300 in order to receive a page for the voice connection request.

A primary method intended for voice connections between the mobile wireless device 902 and the LTE wireless network 400 can use a packet voice method known as IMS VoLTE rather than CSFB. The MSC 300 can interact with the call session control function (CSCF) 418 in the LTE wireless network 400 to cause an IP multimedia subsystem (IMS) voice over LTE (VoLTE) connection to start through a session internet protocol (SIP) invite message originating from the P/I/S-CSCF 418 entity, which can be communicated to the mobile wireless device 902 through the E Node B 410. When the mobile wireless device 902 and the LTE 400 can support an IMS VoLTE service, the mobile wireless device 902 can complete a call to another mobile wireless device on a separate wireless network; however, when the IMS VoLTE service is not available in the LTE wireless network 400 or the mobile wireless device 902 is unable to support the IMS VoLTE service, a different method to provide voice connections for the mobile wireless device 902 can be required. In particular, the mobile wireless device 902 can use an existing CDMA2000 1x wireless network 300 to form a voice connection based on an alternative method that differs from the CSFB method or the IMS VoLTE method described above. The mobile wireless device 902 can be registered simultaneously on the LTE wireless network 400 and the CDMA2000 1x wireless network 300. The mobile wireless device 902 can be normally camped on or connected to the LTE wireless network 400 and can switch to the CDMA2000 1x wireless network 300 to establish circuit switched voice connections when notified of an incoming voice connection through the LTE wireless network 400. As the mobile wireless device 902 can be registered on both the LTE wireless network 400 and the CDMA2000 1x wireless network 300 simultaneously, each wireless network can page the mobile wireless device 902 independently. The LTE wireless network 400 can attempt to form a voice connection through the LTE wireless network 400 to the mobile wireless device 902, and in response the mobile wireless device 902 can switch over to the CDMA2000 1x wireless network 300 to receive a parallel page and form a connection through the CDMA2000 1x wireless network 300 instead of through the LTE wireless network 400.

Figure 10:
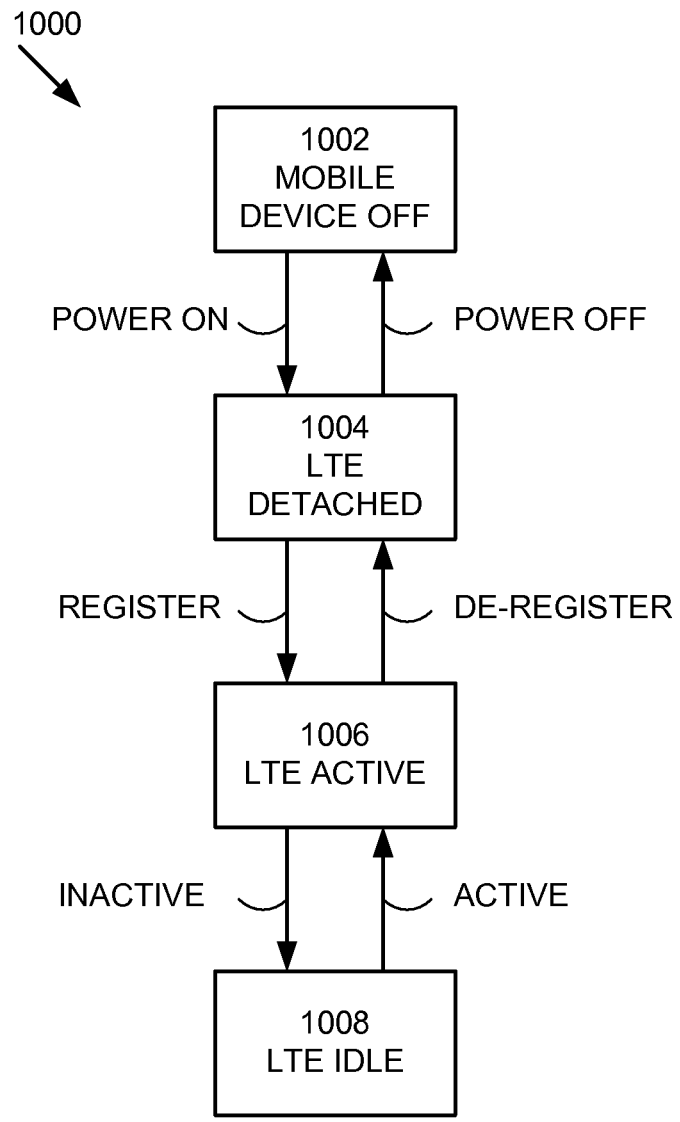
FIG. 10 illustrates a state transition diagram for a mobile wireless device in an LTE wireless network.

FIG. 10 illustrates a state transition diagram 1000 for the mobile wireless device 902 operating in the LTE wireless network 400. When powering on from a "powered off" mobile wireless device "off" state 1002, the mobile wireless device 902 enters an LTE detached stated 1004, in which the mobile wireless device 902 can be not yet associated with (or known to) to the LTE wireless network 400. The mobile wireless device 902 can search for and register with the LTE wireless network 400 in the LTE detached state 1004. After the mobile wireless device 902 registers with the LTE wireless network 400, the mobile wireless device can enter an LTE active state 1006 and can have a radio resource control (RRC) connection to the E Node B 410 in the LTE wireless network 400. The mobile wireless device 902 in the LTE active state 1006 can be located by the LTE wireless network 400 down to the cell/radio sector level. If the mobile wireless device 902 changes location while in the LTE active state 1006, any changes in cells/radio sectors to which the mobile wireless device 902 is connected can be managed and known to the LTE wireless network 400. When the mobile wireless device 902 has no data to send or receive with the LTE wireless network 400, in order to conserve power the mobile wireless device 902 can transition to an LTE idle state 1008. While in the LTE idle state 1008, the mobile wireless device 902 can be tracked only to a granularity known as a tracking area, which can include a set of cells/radio sectors that each use different E Node Bs 410. To determine the specific cell in which the mobile wireless device 902 can be located in the LTE idle state 1008, the LTE wireless network 400 can page the mobile wireless device 902 before establishing a mobile terminated connection with the mobile wireless device 902. When the mobile wireless device 902 changes location while in the LTE idle state 1008, the mobile wireless device 902 can determine and send updates to the LTE wireless network 400 when traversing tracking area boundaries.

In order for the CDMA2000 1x wireless network 300 to be aware of the mobile wireless device 902, the mobile wireless device 902 can register with the CDMA2000 1x wireless network 300 (in addition to registering with the LTE wireless network 400). The mobile wireless device 902 can perform a power up registration with the CDMA2000 1x wireless network 300 when the mobile wireless device 902 boots up. The mobile wireless device 902 can then camp on an eNodeB 410 of an eUTRAN 406 in the parallel LTE wireless network 400 and can periodically re-register with the CDMA2000 1x wireless network 300 as required. After boot up, the mobile wireless device 902 can tune its single receiver away from the eUTRAN 406 of the LTE wireless network 400 with which it is registered and can perform periodic timer based registration, distance based registration, zone based registration and/ or parameter change based registration with the CDMA2000 1x wireless network 300 as required. Thus, while the mobile wireless device 902 can be camped on the eUTRAN 406 of the LTE wireless network 400 normally, the mobile wireless device 902 can tune to the CDMA2000 1x wireless network 300 to perform any required re-registrations to maintain a locatable presence with the CDMA2000 1x wireless network 300. Registrations with the CDMA2000 1x wireless network 300 can ensure that the CDMA2000 1x wireless network 300 can locate the mobile wireless device 902 and can deliver any pages to a correct group of cell sites of the CDMA2000 1x wireless network 300 for the mobile wireless device 902 to receive.

Figure 11:
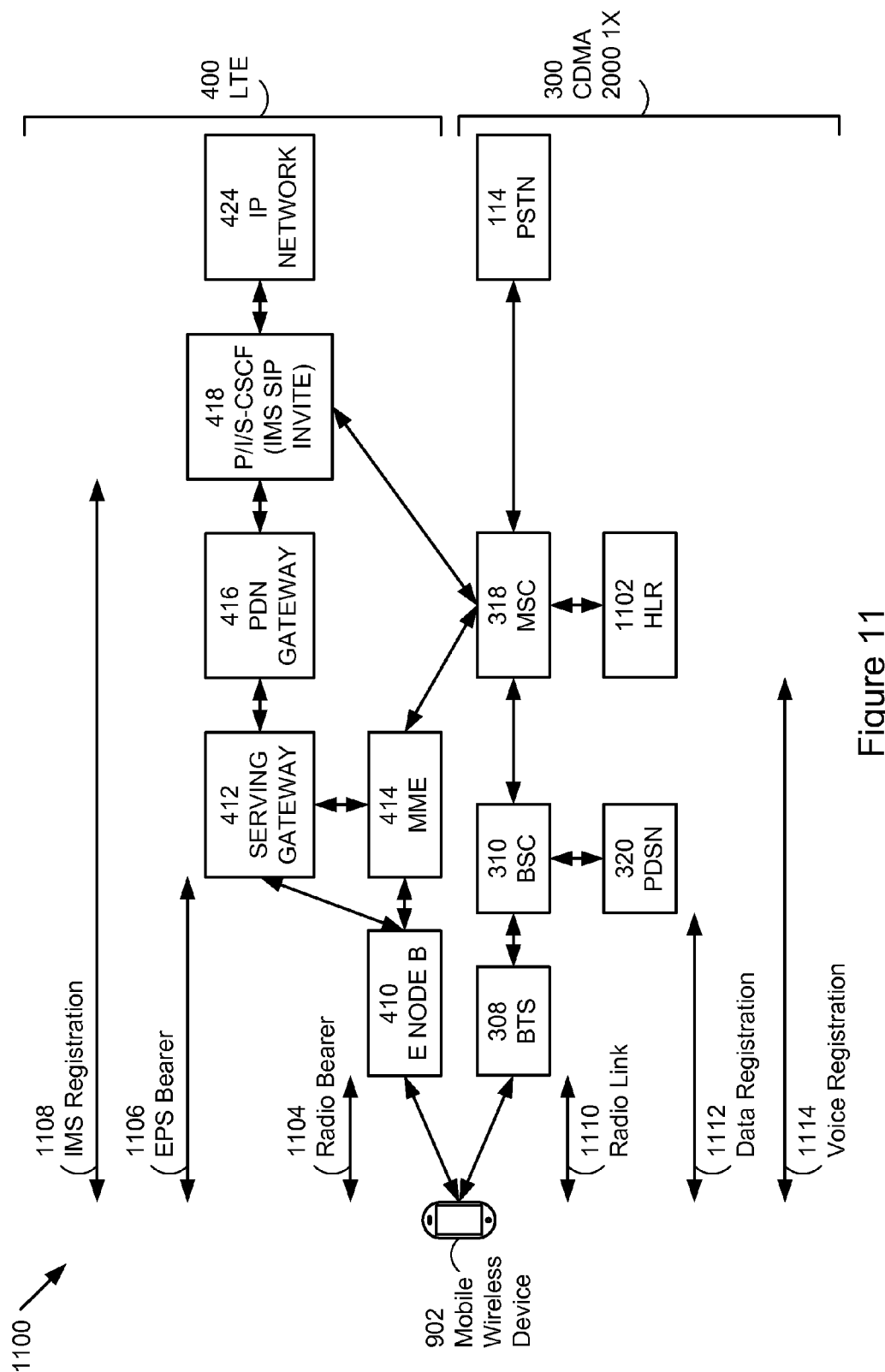
FIG. 11 illustrates connection elements for a mobile wireless device in an LTE wireless network and in a CDMA2000 1x wireless network.

FIG. 11 illustrates several different connections that can exist simultaneously between the mobile wireless device 902 and the LTE wireless network 400 and the CDMA2000 1x wireless network 300. When in an active state, the mobile wireless device 902 can have one or more radio bearers 1104 allocated that can connect the mobile wireless device 902 to the eNodeB 410 of the access portion of the LTE wireless network 400. A default evolved packet system (EPS) bearer 1106 can be assigned to the mobile wireless device 902 when connecting to the LTE wireless network 400 and can be used for radio resource control (RRC) signaling. Additional dedicated EPS bearers 1106 can be assigned to the mobile wireless device 902 to support data traffic services having particular quality of service (QoS) characteristics required for the particular data traffic service carried on the dedicated EPS bearer 1106. Setup of the dedicated EPS bearers 1106 can be considered analogous to establishing a packet data protocol (PDP) context in a GSM/GPRS/UMTS network 200. Before the mobile wireless device 902 can receive an IMS service over the LTE wireless network 400, the mobile wireless device 902 can complete an IMS registration 1108 with the call session control function (CSCF) shown in the P/I/S-CSCF 418 block of the LTE wireless network 400. The mobile wireless device 902 can have established a default EPS bearer 1106 that can be used for IMS signaling. Following IMS registration (and authentication) services can be provided to the mobile wireless device 902 by the LTE wireless network 400.

Similar to radio bearers 1104 on the LTE wireless network 400, one or more radio links 1110 on the CDMA2000 1x wireless network 300 can transport signals between the mobile wireless device 902 and the base transceiver system (BTS) 308. To receive voice connection requests, the mobile wireless device 902 can perform a voice registration 1114 with the home location register (HLR) 1102 that can contain subscriber information in the CDMA2000 1x wireless network 300. For data services in the CDMA2000 1x wireless network 300, a data registration 1112 of the mobile wireless device 902 and receipt and delivery of packet data can be handled by the packet data serving node (PDSN) 320. For a single receiver mobile wireless device 902, we can expect that data services can be provided through the LTE wireless network 400, while voice services can be provided through the CDMA2000 1x wireless network 300 (in the absence of CSFB or VoLTE services). As such, registration on the CDMA2000 1x wireless network 300 as described herein can refer to "voice" registration 1114 rather than to "data" registration 1112.

The mobile wireless device 902 can use knowledge of its own location for zone based registration with the LTE wireless network 400 and the CDMA2000 1x wireless network 300. The mobile wireless device 902 can use a location technique such as available from GPS or harvested from WiFi access point locations or from LTE cell/radio sector site data to keep track of its own location. During a location change, while camped on or connected to the LTE wireless network 400, the mobile wireless device 902 can tune away from the eUTRAN 406 of the LTE wireless network 400 to ensure that the mobile wireless device 902 keeps track of registration zones for the CDMA2000 1x wireless network (or for any accompanying changes of registration zones of the CDMA2000 1x wireless network 300). The mobile wireless device 902 can perform any zone based re-registrations as required while its receiver is tuned to the CDMA2000 1x wireless network 300. When the mobile wireless device 902 does not store data of registration zones (e.g. no previously harvested data) for the CDMA2000 1x wireless network 300, the mobile wireless device 902 can query a server to learn LTE wireless network 400 cell/radio sector site information and/or WiFi access point information and thereby retrieve registration zones for the CDMA2000 1x wireless network 300. Maintaining registration with the LTE wireless network 400 and the CDMA2000 1x wireless network 300 simultaneously and accurately updating location information of the mobile wireless device 902 within the wireless networks 300/400 can ensure that pages destined for the mobile wireless device 902 can be sent to the correct cells/radio sectors in the respective wireless networks 300/400.

Figure 12:
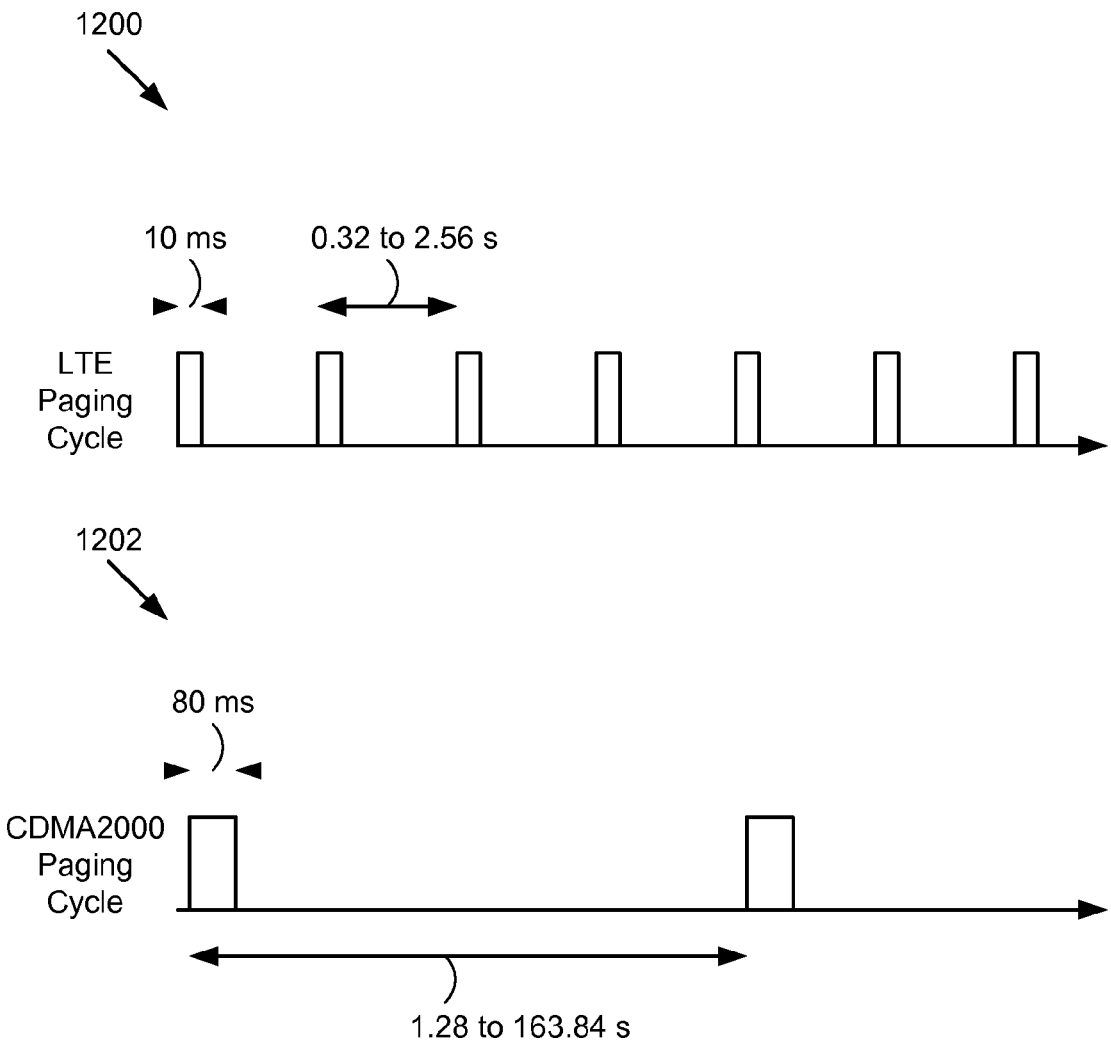
FIG. 12 illustrates representative paging cycles for an LTE wireless network operating in parallel with a CDMA2000 1x wireless network.

FIG. 12 illustrate representative paging cycles 1200/1202 for the LTE wireless network 400 and the CDMA2000 1x wireless network 300 respectively. The LTE paging cycle 1200 can consist of a series of 10 ms time periods during which a page can be received by the mobile wireless device 902, each time period separated by a time interval spanning 320 to 2560 ms. In a typical LTE wireless network 400 configuration, successive paging periods in the LTE paging cycle 1200 can be spaced 1280 ms apart. To conserve battery power, the mobile wireless device 902 in an LTE idle state 1008 can power up its receiver during the 10 ms LTE paging time period and power down the receiver in between the LTE paging time periods. The CDMA2000 1x wireless network 300 paging cycle 1202 can include 80 ms paging periods, each paging period separated by a time interval spanning 1.28 to 163.84 seconds. In a typical CDMA2000 1x wireless network 300, the paging periods can be separated by 5.12 seconds. Rather than have the mobile wireless device 902 switch between the LTE wireless network 400 and the CDMA2000 1x wireless network 300 to listen for pages during each paging period of the CDMA2000 paging cycle 1202, the mobile wireless device 902 can rely on a direct or on an indirect indication from the LTE wireless network 400 of an incoming request to establish a voice connection with the mobile wireless device 902 received through the LTE wireless network 400 as described next.

The P/I/S-CSCF 418 block in the LTE wireless network 400 can send a SIP invite message (or another equivalent message) to the mobile wireless device 902 that can contain information about one or more target cells/radio sectors in the CDMA2000 1x wireless network 300 in which the mobile wireless device 902 can be expected to receive pages requesting to establish an incoming voice connection with the mobile wireless device 902. Information provided in the SIP invite message by the LTE wireless network 400 can help the mobile wireless device 902 to camp on the CDMA2000 1x wireless network 300 as early as possible to listen for an incoming voice connection request and thus to reduce call setup latency for incoming voice connections. The SIP invite message can be a "request" type message inviting the mobile wireless device 902 to participate in a call session. In a "normal" SIP session, the receiving end point (i.e. the mobile wireless device 902) can respond to the SIP invite message by sending an affirmative or failure response, to which the originating end point (i.e. the P/I/S-CSCF 418) can return an ACK or BYE message. The body of the SIP invite message can contain information on CDMA2000 1x wireless network 300 cells/radio sectors over which pages can be sent to the mobile wireless device 902 in order to form a mobile terminated voice connection with the mobile wireless device 902 through the CDMA2000 1x wireless network 300. The LTE wireless network 400 thus can act as a "relay" for establishing a voice connection with the mobile wireless device 902 through the CDMA2000 1x wireless network 300. Essentially, the mobile wireless device 902 can be paged simultaneously on both the LTE wireless network 400, to which it can be connected or on which it can be camped, and on the CDMA2000 1x wireless network 300, on which it can be registered but not connected or camped. As the mobile wireless device 902 can contain a single receiver tuned to the LTE wireless network 400 and not contain a second receiver tuned to the CDMA2000 1x wireless network 300, the "relay" function provided by the LTE wireless network 400 can inform the mobile wireless device 902 about incoming pages requesting voice connections from the CDMA2000 1x wireless network 300 so that the mobile wireless device 902 can re-tune to the CDMA2000 1x wireless network 300 to receive a page requesting a voice connection and then to establish a voice connection with the CDMA2000 1x wireless network 300.

When the mobile wireless device 902 receives a page from the LTE wireless network 400 to establish a voice connection, the mobile wireless device 902 can reject the page from the LTE wireless network 400 indirectly based on knowledge of the dedicated EPS bearer 1106 being established for the received page. The mobile wireless device 902 can detect a bearer type during EPS bearer 1106 establishment. When the mobile wireless device 902 detects that a bearer is being established for a mobile terminated (MT) voice call on the eUTRAN 406 of the LTE wireless network 400 over IMS, the mobile wireless device 902 can tune its receiver to the CDMA2000 1x wireless network 300 in order to receive a page message from the CDMA2000 1x wireless network 300 and subsequently complete the MT voice call establishment through the CDMA2000 1x wireless network 300 rather than completing the voice over IMS call through the LTE wireless network 400. The mobile wireless device 902 can switch from the LTE wireless network 400 to the CDMA2000 1x wireless network 300 without responding to the page from the LTE wireless network 400 directly. Parallel paging of the mobile wireless device 902 in the CDMA2000 1x wireless network 300 and the LTE wireless network 400 can ensure that the mobile wireless device 902 can receive an incoming call irrespective of the current wireless network on which it can be camped. The LTE wireless network 400 can send the SIP invite message with a format similar to what would be sent to a mobile wireless device 902 that can support VoLTE; however, a mobile wireless device 902 that does not support VoLTE can instead establish a voice connection through the parallel CDMA2000 1x wireless network 300 rather than through the LTE wireless network 400.

The mobile wireless device 902 can also respond to the page received from the LTE wireless network 400 by sending an explicit reject message to the LTE wireless network 400 in response to the IMS invite message and can bring down an associated dedicated LTE EPS bearer 1106. The mobile wireless device 902 can send a SIP reject to the LTE wireless network 400 by using a 4xx code or other existing or custom code that can indicate to the LTE wireless network 400 that the voice connection will not be completed through the LTE wireless network 400. The response to the IMS invite message need not indicate to the LTE wireless network 400 that the mobile wireless device 902 will connect instead through the parallel CDMA2000 1x wireless network 300. In addition to rejecting the page received from the LTE wireless network 400 and to releasing any dedicated EPS bearer 1106 being established, the mobile wireless device 902 can also initiate a radio resource control (RRC) connection release with the LTE wireless network 400. The RRC connection release can trigger a mobile management entity (MME) 414 in the LTE wireless network 400 to complete an S1 context release. The default EPS bearer 1106 can thus also be brought down by the mobile wireless device 902 when responding to the IMS invite message in addition to any dedicated EPS bearer 1106.

The mobile wireless device 902 can also send an explicit SIP reject message in response to the IMS invite message received from the LTE wireless network 400 and can tune its single receiver to the CDMA2000 1x wireless network 300 immediately without releasing an established default EPS bearer 1106. The mobile wireless device 902 can send a SIP reject by using a 4xx code or other existing or custom code, as above, but the RRC connection can be not released before tuning the receiver in the mobile wireless device 902 to the CDMA2000 1x wireless network 300 from the LTE wireless network 400. The mobile wireless device 902 can tune its single receiver to the CDMA2000 1x wireless network 300 immediately, which can allow for quicker reception of a page from the CDMA2000 1x wireless network 300.

Network planning for the eUTRAN 406 in the LTE wireless network 400 can be implemented in a manner such that a tracking area identifier (TAI) in the LTE wireless network 400 can be mapped to one or more registration zones in the CDMA2000 1x wireless network 300. The LTE wireless network 400 can plan the set of TAI such that the mobile wireless device 902 can detect a change in CDMA2000 1x wireless network 300 registration zone based on a change in the TAI for the LTE wireless network 400. Thus, the mobile wireless device 902 can register with the CDMA2000 1x wireless network 300, initially upon power up, and can expect to have pages sent to appropriate cells/radio sectors in the CDMA2000 1x wireless network 300 until a change in registration zone is detected (e.g. indirectly through knowledge of the TAI) by the mobile wireless device 902. With an alignment of the TAI of the LTE wireless network 400 with the registration zones of the CDMA2000 1x wireless network 300, the mobile wireless device 902 can more easily detect a CDMA2000 1x wireless network 300 registration zone change, and hence with the alignment the mobile terminated call performance rate of the mobile wireless device 902 can be improved.

The mobile wireless device 902 can be paged simultaneously through the eUTRAN 406 of the LTE wireless network 400 and through the BSS 306 in the radio access network 328 of the CDMA2000 1x wireless network 300. The mobile wireless device 902 can receive an IMS SIP invite message delivered through the eUTRAN 406 of the LTE wireless network and can then tune its single receiver to the CDMA2000 1x wireless network 300. Simultaneous paging over both the LTE wireless network 400 and the CDMA2000 1x wireless network 300 can reduce call set up latency and can require less state management. When the CDMA2000 1x wireless network 300 has a larger slot cycle index than the paging cycle of the LTE wireless network 400 and of the paging cycle of the CDMA2000 1x wireless network 300, repeat paging can be used and the chance of the mobile wireless device 902 missing a page can be reduced.

When the mobile wireless device 902 originates a circuit switched call, the mobile wireless device 902 can tune its receiver from the LTE wireless network 400 to the CDMA2000 1x wireless network 300. The mobile wireless device 902 can camp on the CDMA2000 1x wireless network 300 and can originate a circuit switched mobile originated voice connection according to relevant 3GPP2 specifications. The mobile wireless device 902 can choose to perform an RRC connection release with the eUTRAN 406 of the LTE wireless network 400 prior to switching its transceiver to the CDMA2000 1x wireless network 300. Alternatively, to reduce call set up latency, the mobile wireless device 902 can choose to switch its transceiver to the CDMA2000 1x wireless network 300 immediately when initiating a circuit switched voice connection over the CDMA2000 1x wireless network 300 without performing an RRC connection release to the LTE wireless network 400. When the voice connection between the mobile wireless device 902 and the CDMA2000 1x wireless network 300 last a relatively short time period, the RRC connection to the LTE wireless network 300 can still be present when the mobile wireless device 902 retunes its transceiver to the LTE wireless network 400 from the CDMA2000 1x wireless network 300. For sufficiently long voice connections between the CDMA2000 1x wireless network 300 and the mobile wireless device 902, however, a timeout for the RRC connection between the mobile wireless device 902 and the lTE wireless network 400 can occur. A new RRC connection between the mobile wireless device 902 and the LTE wireless network 400 can be re-established if required.

Figure 13:
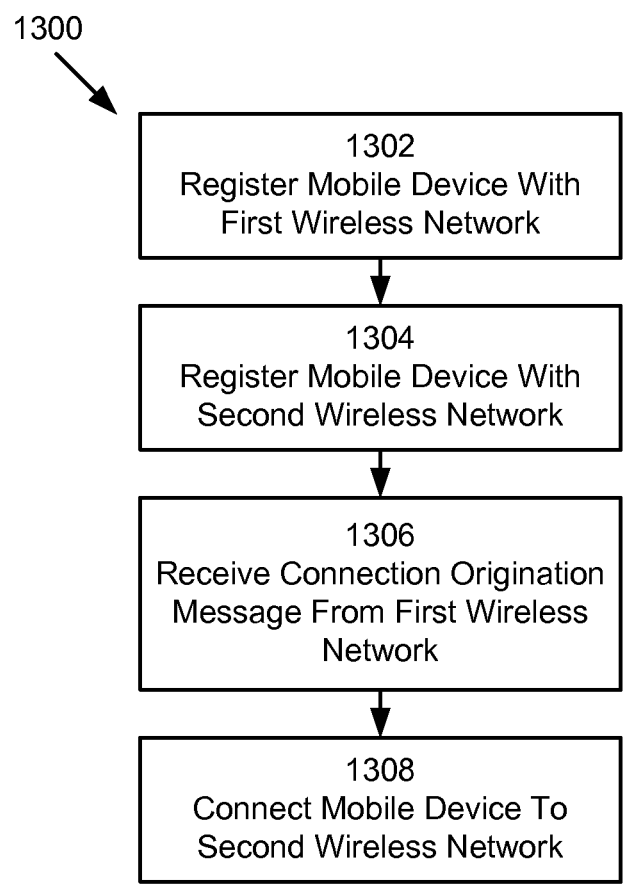
FIG. 13 illustrates a representative method for connection management of a mobile wireless device in communication with multiple wireless networks.

FIG. 13 illustrates a method 1300 for managing connections between the mobile wireless device 902 and two different wireless networks. In step 1302, the mobile wireless device 902 registers with a first wireless network. In step 1304, the mobile wireless device 902 registers with a second wireless network, different from the first wireless network. In a representative embodiment, the first and second wireless networks use two different wireless communication technologies. The mobile wireless device 902 is registered simultaneously on the two different wireless networks. The mobile wireless device 902, in step 1306, receives a connection origination message from the first wireless network. The connection origination message, in one embodiment, can request a connection through the first wireless network, while in another embodiment, the connection origination message can indicate an incoming connection request for the second wireless network. In step 1308, the mobile wireless device 902 can connect to the second wireless network rather than to the first wireless network from which the connection request was received by the mobile wireless device 902. In a representative embodiment, the mobile wireless device 902 can include a single receiver that can be tuned to either the first wireless network or to the second wireless network. The mobile wireless device 902 can include only the single receiver rather than dual receivers, and thus the mobile wireless device 902 can be incapable of receiving signals, such as paging messages, from the second wireless network when connected to the first wireless network.

Figure 14:
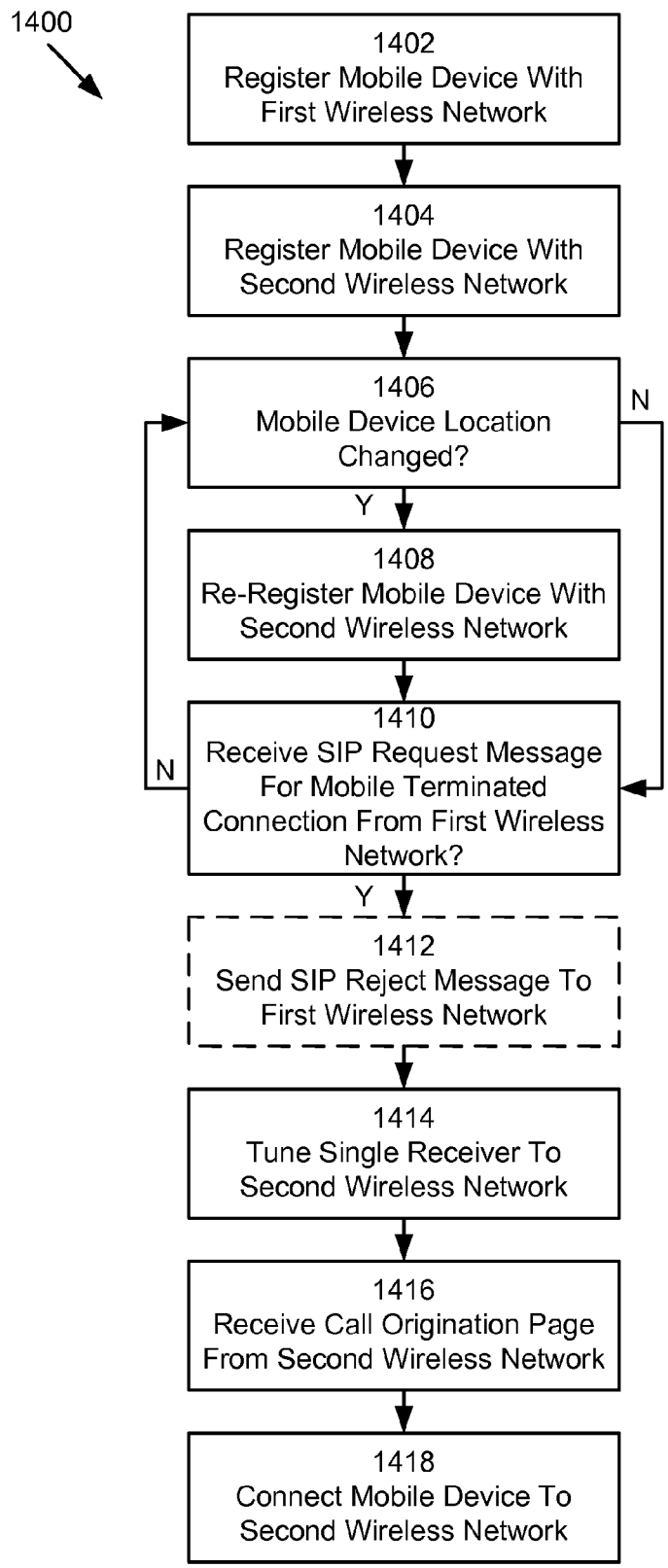
FIG. 14 illustrates a representative method for management of a mobile terminated connection for a mobile wireless device in communication with multiple wireless networks.

FIG. 14 illustrates another method 1400 for managing connectivity between the mobile wireless device 902 and two different wireless networks. In step 1402, the mobile wireless device 902 registers with the first wireless network. In step 1404, the mobile wireless device 902 registers with the second wireless network. In step 1406, the mobile wireless device 902 determines if the physical location of the mobile wireless device 902 has changed. If the physical location of the mobile wireless device 902 has changed, then in step 1408, the mobile wireless device 902 re-registers with the second wireless network. By re-registering, the mobile wireless device 902 provides a registration zone update to the second wireless network that can be unaware of the change in physical location of the mobile wireless device 902. If the physical location of the mobile wireless device 902 has not changed as determined in step 1406, or following a re-registration step 1408, the mobile wireless device 902 can determine if a SIP request message has been received from the first wireless network in step 1410. The SIP request message can request a mobile terminated connection, such as a voice connection through the first wireless network. In one embodiment, the mobile wireless device 902 can be incapable of completing the voice connection through the first wireless network but can complete a voice connection through the second wireless network. If no SIP request message is received from the first wireless network in step 1410, the mobile wireless device 902 can repeat the location monitoring and re-registering steps while waiting for a SIP request message, i.e. cycle through steps 1406 to 1410.

When the mobile wireless device 902 receives a SIP request message from the first wireless network in step 1410, the mobile wireless device 902 can optionally send a SIP reject message to the first wireless network in step 1412. The SIP reject message can indicate to the first wireless network that the mobile wireless device 902 will not complete the requested connection through the first wireless network. In step 1414, the mobile wireless device can tune a single receiver to the second wireless network from the first wireless network. In step 1416, the mobile wireless device can wait and receive a call origination page from the second wireless network. The mobile wireless device 902 can be aware that a call origination page is available to receive based on having received the SIP request message in parallel on the first wireless network. In response to receipt of the call origination page from the second wireless network in step 1416, the mobile wireless device 902 can complete a voice connection with the second wireless network in step 1418.

Figure 15:
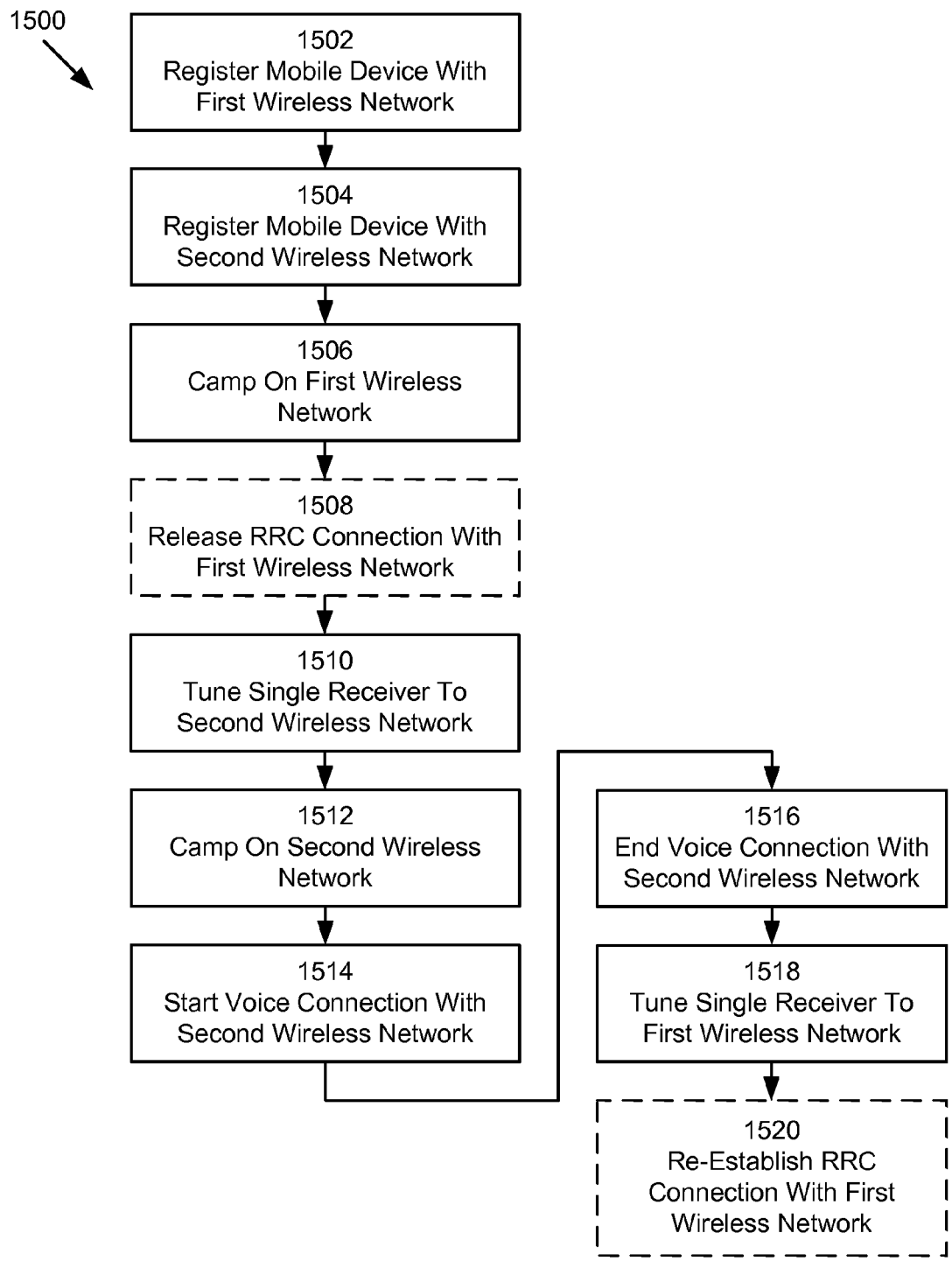
FIG. 15 illustrates a representative method for management of a mobile originated connection for a mobile wireless device in communication with multiple wireless networks.

FIG. 15 illustrates yet another method 1500 for managing connections between the mobile wireless device 902 and multiple wireless networks. In step 1502, the mobile wireless device 902 registers with the first wireless network and in step 1504, the mobile wireless device 902 registers with the second wireless network. In step 1506, the mobile wireless device 902 camps on the first wireless network. The mobile wireless device 902 can initiate a mobile originated voice connection by switching from the first wireless network to the second wireless network. In an embodiment, in step 1508, the mobile wireless device 902 releases a radio resource control (RRC) connection with the first wireless network prior to switching to the second wireless network. The RRC connection release step 1508 can be optional. In step 1510, the mobile wireless device 902 tunes its single receiver from the first wireless network to the second wireless network. In step 1512, the mobile wireless device 902 camps on the second wireless network. In step 1514, the mobile wireless device 902 starts a voice connection with the second wireless network. In step 1516, the mobile wireless device 902 ends the established voice connection with the second wireless network. The mobile wireless device 902, in step 1518, re-tunes its single receiver back to the first wireless network from the second wireless network. In step 1520, the mobile wireless device 902 re-establishes an RRC connection with the first wireless network when the prior RRC connection no longer exists. The RRC connection can have been released, e.g. in optional step 1508, or can have been dropped because of a timeout that can occur on the first wireless network when the mobile wireless device 902 is connected to the second wireless network for the voice connection.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method of managing connections between a mobile wireless device, which includes a single tunable receiver, and a plurality of wireless networks, the method comprising:
   registering the mobile wireless device with a first wireless network to receive paging messages directly from the first wireless network;
   simultaneously registering the mobile wireless device with a second wireless network to receive paging messages directly from the second wireless network;
   receiving an Internet Protocol Multimedia Subsystem (IMS) connection origination message at the mobile wireless device from the first wireless network;
   in response to receiving the IMS connection origination message, rejecting the IMS connection from the first wireless network by at least sending a message to the first wireless network before connecting the mobile wireless device to the second wireless network; and
   maintaining simultaneous registration of the mobile wireless device with the first wireless network and the second wireless network.

2. The method as recited in claim 1, wherein the message sent to the first wireless network by the mobile wireless device to reject the IMS connection comprises an IMS connection rejection message.

3. The method as recited in claim 2, wherein the IMS connection origination message comprises a Session Initiation Protocol (SIP) invite message, and the IMS connection rejection message comprises a SIP reject message.

4. The method as recited in claim 1, further comprising:
   in response to receiving the IMS connection origination message from the first wireless network:
   releasing one or more radio access bearers between the mobile wireless device and the first wireless network;
   tuning the single tunable receiver in the mobile wireless device from the first wireless network to the second wireless network; and
   receiving a connection request from the second wireless network.

5. The method as recited in claim 1, wherein the first wireless network uses a 3GPP LTE wireless communications protocol, and the second wireless network uses a 3GPP2 CDMA2000 1x wireless communications protocol.

6. The method as recited in claim 1, further comprising:
   monitoring a physical location of the mobile wireless device; and
   re-registering the mobile wireless device with the second wireless network after detecting the physical location of the mobile wireless device changes between distinct registration zones of the second wireless network.

7. The method as recited in claim 6, wherein monitoring the physical location of the mobile wireless device includes tracking at least one of a global positioning system location of the mobile wireless device, a Wi-Fi access point location, and a cell site location of the first wireless network.

8. A mobile wireless device comprising:
   a receiver tunable to receive signals from a first wireless network and also tunable to receive signals from a second wireless network; and
   a processor configured to:
   register the mobile wireless device with the first and second wireless networks simultaneously to receive paging messages directly from the first and second wireless networks;
   receive an Internet Protocol Multimedia Subsystem (IMS) connection origination message from the first wireless network, and in response, reject the IMS connection from the first wireless network by at least sending a message to the first wireless network before establishing a connection between the mobile wireless device and the second wireless network,
   wherein the first wireless network and the second wireless network use different wireless communication protocols.

9. The mobile wireless device as recited in claim 8, wherein the processor is further configured to:
   in response to receiving the IMS connection origination message from the first wireless network;
   release one or more radio access bearers between the mobile wireless device and the first wireless network;
   tune the receiver in the mobile wireless device from the first wireless network to the second wireless network; and
   receive a connection request from the second wireless network,
   wherein the message sent to the first wireless network to reject the IMS connection comprises an IMS connection rejection message.

10. The mobile wireless device as recited in claim 9, wherein the IMS connection origination message comprises a Session Initiation Protocol (SIP) invite message, and the IMS connection rejection message comprises a SIP reject message.

11. The mobile wireless device as recited in claim 8, wherein the processor is further configured to:
   monitor a physical location of the mobile wireless device;
   periodically tune the receiver in the mobile wireless device from the first wireless network to the second wireless network;
   detect a change in registration zone of the second wireless network; and
   re-register the mobile wireless device with the second wireless network when a change in registration zone is detected.

12. The mobile wireless device as recited in claim 8, wherein the processor is further configured to:
- detect a change in tracking area identifiers for the first wireless network as the mobile wireless device changes physical location;
- map the detected tracking area identifiers to registration zones for the second wireless network;
- determine a change in registration zones for the second wireless network as the mobile wireless device changes physical location using the mapped and detected tracking area identifiers; and
- re-register the mobile wireless device with the second wireless network when determining a change in registration zones occurs.

13. The mobile wireless device as recited in claim 8, wherein the processor is further configured to:
- detect a bearer type establishment associated with the IMS connection origination message received from the first wireless network;
- when determining the bearer type establishment is for a mobile terminated voice connection through the first wireless network, tune the receiver in the mobile wireless device from the first wireless network to the second wireless network; and
- after receiving a page message from the second wireless network, complete the mobile terminated voice connection through the second wireless network.

14. The mobile wireless device as recited in claim 8, wherein the processor is further configured to:
- determine a physical location of the mobile wireless device based on one or more pieces of location information including global positioning system information for the mobile wireless device, location information for one or more Wi-Fi access points and location information for cell sites of the first wireless network; and
- re-register the mobile wireless device with second wireless network when a change in physical location of the mobile wireless device indicates a change in paging areas of the second wireless network.

15. The mobile wireless device as recited in claim 8, wherein the first wireless network uses a 3GPP LTE wireless communications protocol, and the second wireless network uses a 3GPP2 CDMA2000 1x wireless communications protocol.

16. A non-transitory computer-readable medium storing instructions for managing connections between a mobile wireless device and a plurality of wireless networks, the instructions, when executed by a processor of the mobile wireless device, cause the mobile wireless device to perform steps comprising:
- registering the mobile wireless device with a first wireless network to receive paging messages directly from the first wireless network;
- simultaneously registering the mobile wireless device with a second wireless network to receive paging messages directly from the second wireless network;
- receiving an Internet Protocol Multimedia Subsystem (IMS) connection origination message at the mobile wireless device from the first wireless network; and
- in response to receiving the IMS connection origination message, rejecting the IMS connection from the first wireless network by at least sending a message to the first wireless network before connecting the mobile wireless device to the second wireless network wherein the first wireless network and the second wireless network each use a different wireless communications protocol.

17. The non-transitory computer-readable medium as recited in claim 16, the steps further comprising:
- in response to receiving the IMS connection origination message from the first wireless network:
- releasing one or more radio access bearers between the mobile wireless device and the first wireless network;
- tuning a receiver in the mobile wireless device from the first wireless network to the second wireless network; and
- receiving a connection request from the second wireless network,
- wherein the message sent to the first wireless network to reject the IMS connection comprises an IMS connection rejection message.

18. The non-transitory computer-readable medium as recited in claim 17, wherein the IMS connection origination message comprises a Session Initiation Protocol (SIP) invite message, and the IMS connection rejection message comprises a SIP reject message.

19. The non-transitory computer-readable medium as recited in claim 17, the steps further comprising:
- monitoring a physical location of the mobile wireless device;
- tuning the receiver in the mobile wireless device from the first wireless network to the second wireless network when detecting a change in the physical location of the mobile wireless device that cross a pre-determined boundary of tracking areas for the first wireless network;
- detecting a change in registration zone of the second wireless network; and
- re-registering the mobile wireless device with the second wireless network when a change in registration zone is detected.

20. The non-transitory computer-readable medium as recited in claim 19, the steps further comprising:
- mapping tracking areas of the first wireless network to registration zones for the second wireless network.

21. The non-transitory computer-readable medium as recited in claim 20, wherein monitoring the physical location of the mobile wireless device uses at least global positioning system information for the mobile wireless device and location information from one or more cell sites of the first wireless network.

22. The non-transitory computer-readable medium as recited in claim 16, the steps further comprising:
- detecting a bearer type establishment associated with the IMS connection origination message received from the first wireless network;
- tuning the receiver in the mobile wireless device from the first wireless network to the second wireless network when determining the bearer type establishment is for a mobile terminated voice connection through the first wireless network; and
- completing the mobile terminated voice connection through the second wireless network after receiving a page message from the second wireless network.

23. The non-transitory computer-readable medium as recited in claim 16, wherein the first wireless network uses a 3GPP LTE wireless communications protocol, and the second wireless network uses a 3GPP2 CDMA2000 1x wireless communications protocol.

* * * * *